United States Patent
Bergman et al.

(10) Patent No.: US 10,431,062 B1
(45) Date of Patent: Oct. 1, 2019

(54) SYSTEMS AND METHODS FOR AUTOMATED SECURITY TAG DETACHMENT

(71) Applicants: Adam S. Bergman, Boca Raton, FL (US); Sergio M. Perez, Lake Worth, FL (US); Channing E. Miller, Fort Lauderdale, FL (US)

(72) Inventors: Adam S. Bergman, Boca Raton, FL (US); Sergio M. Perez, Lake Worth, FL (US); Channing E. Miller, Fort Lauderdale, FL (US)

(73) Assignee: Sensomatic Electronics, LLP, Boca Raton, FL (US)

( * ) Notice: Subject to any disclaimer, the term of this patent is extended or adjusted under 35 U.S.C. 154(b) by 0 days.

(21) Appl. No.: 16/050,338

(22) Filed: Jul. 31, 2018

(51) Int. Cl.
*G08B 13/24* (2006.01)
*G06Q 10/08* (2012.01)

(52) U.S. Cl.
CPC ....... *G08B 13/2434* (2013.01); *G08B 13/246* (2013.01); *G08B 13/2454* (2013.01); *G06Q 10/087* (2013.01)

(58) Field of Classification Search
CPC ............ G08B 13/2434; G08B 13/2454; G08B 13/246; G06Q 10/087
USPC ...................................................... 340/572.8
See application file for complete search history.

(56) References Cited

U.S. PATENT DOCUMENTS

| | | | | |
|---|---|---|---|---|
| 5,426,419 A | * | 6/1995 | Nguyen | E05B 73/0017 340/572.9 |
| 5,528,914 A | * | 6/1996 | Nguyen | E05B 73/0017 206/1.5 |
| 5,535,606 A | * | 7/1996 | Nguyen | E05B 73/0017 307/139 |
| 5,942,978 A | * | 8/1999 | Shafer | E05B 73/0017 340/10.5 |
| 5,955,951 A | * | 9/1999 | Wischerop | E05B 73/0017 340/10.42 |
| 6,373,390 B1 | * | 4/2002 | Hogan | E05B 73/0017 340/10.1 |
| 8,051,686 B2 | * | 11/2011 | Garner | E05B 17/2015 340/572.1 |
| 8,223,022 B2 | * | 7/2012 | Skjellerup | E05B 73/0017 340/568.1 |
| 8,242,910 B2 | * | 8/2012 | Skjellerup | E05B 73/0017 340/568.1 |

(Continued)

*Primary Examiner* — Omar Casillashernandez
(74) *Attorney, Agent, or Firm* — Fox Rothschild LLP; Robert J. Sacco; Carol E. Thorstad-Forsyth

(57) ABSTRACT

Systems and methods for operating a Security Tag ("ST"). The methods comprise: capturing a first Tack End ("TE") of a Tack Assembly ("TA") by a first Securement Mechanism ("SM") disposed in the ST's body; removing a Tack Head ("TH") from TA so as to expose a second TE that is opposed to the first TE; placing TH on the second TE; and capturing the second TE by a second SM disposed in TH. Alternatively/additionally, the methods comprise: retracting a tack into a TH of TA; depressing TH so as to cause telescoping concentric parts to slide into each other; causing a free end of the tack to travel out of TH while the telescoping concentric parts are being slid into each other; inserting the free end of the tack into ST's body; and capturing the free end of the tack by SM disposed in ST's body.

18 Claims, 21 Drawing Sheets

(56) References Cited

U.S. PATENT DOCUMENTS

| | | | |
|---|---|---|---|
| 8,590,348 B1 * | 11/2013 | Skjellerup | E05B 73/0017 24/704.1 |
| 8,590,349 B2 * | 11/2013 | Skjellerup | E05B 73/0064 70/57.1 |
| D696,599 S * | 12/2013 | Luo | D10/106.9 |
| D714,176 S * | 9/2014 | Perez | D10/106.91 |
| D741,738 S * | 10/2015 | Perez | D10/106.91 |
| 9,183,718 B2 * | 11/2015 | Bergman | G08B 13/2434 |
| 9,218,730 B2 * | 12/2015 | Nguyen | G08B 13/2434 |
| 9,460,597 B1 * | 10/2016 | Clark | G08B 13/2454 |
| 9,702,170 B2 * | 7/2017 | Favier | E05B 73/0017 |
| 9,734,683 B1 * | 8/2017 | Perez | E05B 73/0017 |
| 10,068,449 B2 * | 9/2018 | Ellers | G08B 13/2434 |
| 10,096,217 B2 * | 10/2018 | Skjellerup | G08B 13/2417 |
| 2002/0158762 A1 * | 10/2002 | Nguyen | E05B 73/0017 340/572.9 |
| 2003/0116632 A1 * | 6/2003 | Zimmerman | E05B 73/0017 235/487 |
| 2004/0222890 A1 * | 11/2004 | Yang | E05B 73/0017 340/572.9 |
| 2006/0097872 A1 * | 5/2006 | Ho | E05B 73/0017 340/572.1 |
| 2007/0096925 A1 * | 5/2007 | Yang | E05B 73/0017 340/572.9 |
| 2013/0321155 A1 * | 12/2013 | Nguyen | G08B 13/2434 340/572.8 |
| 2016/0364969 A1 * | 12/2016 | Casanova | E05B 73/0047 |

* cited by examiner

SYSTEMS AND METHODS FOR AUTOMATED SECURITY TAG DETACHMENT

BACKGROUND

Statement of the Technical Field

The present disclosure relates generally to inventory systems. More particularly, the present disclosure relates to implementing systems and methods for automated security tag detachment.

Description of the Related Art

Electronic Article Surveillance ("EAS") systems are often used by retail stores in order to minimize loss due to theft. One common way to minimize retail theft is to attach a security tag to an article such that an unauthorized removal of the article can be detected. In some scenarios, a visual or audible alarm is generated based on such detection. For example, a security tag with an EAS element (e.g., an acousto-magnetic element) can be attached to an article offered for sale by a retail store. An EAS interrogation signal is transmitted at the entrance and/or exit of the retail store. The EAS interrogation signal causes the EAS element of the security tag to produce a detectable response if an attempt is made to remove the article without first detaching the security tag therefrom. The security tag must be detached from the article upon purchase thereof in order to prevent the visual or audible alarm from being generated.

One type of EAS security tag can include a tag body which engages a tack. The tack usually includes a tack head and a sharpened pin extending from the tack head. In use, the pin is inserted through the article to be protected. The shank or lower part of the pin is then locked within a cooperating aperture formed through the housing of the tag body. In some scenarios, the tag body may contain a Radio Frequency Identification ("RFID") element or label. The RFID element can be interrogated by an RFID reader to obtain RFID data therefrom.

The EAS security tag may be removed or detached from the article using a detaching unit. Examples of such detaching units are disclosed in U.S. Pat. Nos. 5,426,419 ("the '419patent), 5,528,914 ("the '914 patent"), 5,535,606 ("the '606 patent"), 5,942,978 ("the '978 patent") and 5,955,951 ("the '951 patent"). The detaching units disclosed in the listed patents are designed to operate upon a two-part hard EAS security tag. Such an EAS security tag comprises a pin and a molded plastic enclosure housing EAS marker elements. During operation, the pin is inserted through an article to be protected (e.g., a piece of clothing) and into an aperture formed through at least one sidewall of the molded plastic enclosure. The pin is securely coupled to the molded plastic enclosure via a clamp disposed therein. The pin is released by a detaching unit via a probe. The probe is normally retracted within the detaching unit. Upon actuation, the probe is caused to travel out of the detaching unit and into the enclosure of the EAS security tag so as to release the pin from the clamp or disengage the clamp from the pin. Once the pin is released from the clamp, the EAS security tag can be removed from the article.

SUMMARY

The present disclosure concerns implementing systems and methods for operating a security tag. The methods comprise: capturing a first tack end of a tack assembly by a first securement mechanism disposed in a body of the security tag; removing a tack head from the tack assembly so as to expose a second tack end that is opposed to the first tack end; inserting the second tack end through an item to be protected; placing the tack head on the second tack end; capturing the second tack end by a second securement mechanism (e.g., a ball clutch) disposed in the tack head; applying a magnetic field to the security tag so that the second tack end is released from the second securement mechanism; and/or removing the tack head from the second tack end after the second tack end has been released from the second securement mechanism.

In some scenarios, the tack head is removed from the second tack end using a gripping mechanism. Additionally or alternatively, the tack head is removed from the second tack end using at least one resilient member disposed in an internal cavity of the tack head. The resilient member is in a compressed state prior to when the magnetic field is applied to the security tag.

In those or other scenarios, the tack head may be coupled to the security tag's body via a lanyard. The tack head comprises a plurality of telescoping concentric parts.

The methods may additionally or alternatively comprise: retracting a tack into a tack head of a tack assembly; depressing the tack head so as to cause a plurality of telescoping concentric parts to slide into each other; causing a free end of the tack to travel out of the tack head while the plurality of telescoping concentric parts are being slid into each other; inserting the free end of the tack into a body of the security tag; capturing the free end of the tack by a securement mechanism disposed in the body of the security tag; releasing the free end of the tack from the securement mechanism using an external tool; and/or automatically causing the plurality of telescoping concentric parts to slide out of each other when the free end of the tack is released from the securement mechanism. In some scenarios, at least one resilient member reliantly biases at least one of the telescoping concentric parts in a direction away from the tag body so as to cause the plurality of telescoping concentric parts to slide out of each other.

BRIEF DESCRIPTION OF THE DRAWINGS

The present solution will be described with reference to the following drawing figures, in which like numerals represent like items throughout the figures.

DETAILED DESCRIPTION

Figure 1:
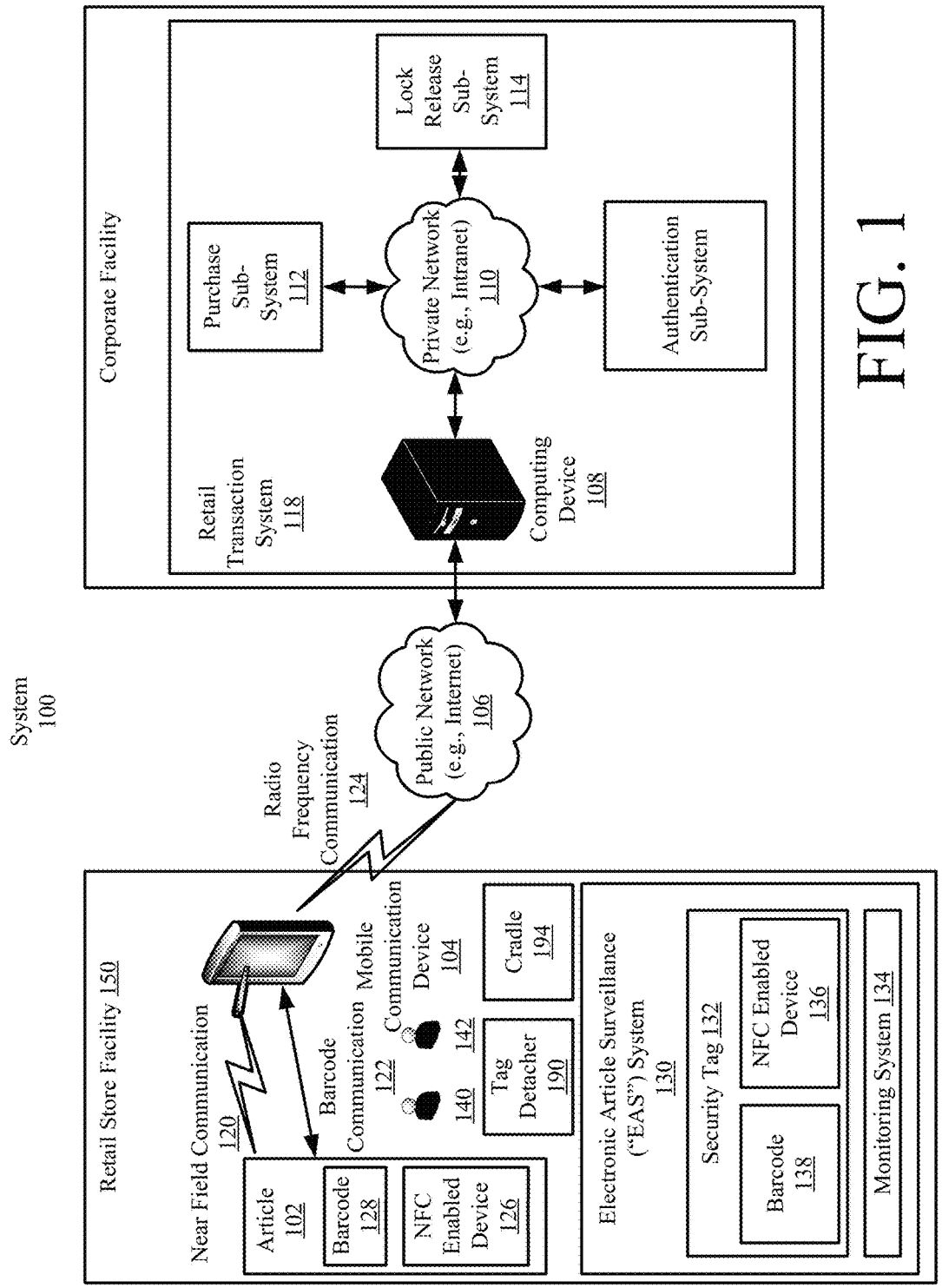
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Mobile shopping apps, shopping websites and self-checkout solutions are becoming more prevalent in retail stores. Presently, there is no way for a retail store to provide a customer with authorization to detach security tags attached to protected retail items. Accordingly when a customer uses a Mobile Point Of Sale ("MPOS") device or a self-checkout kiosk, the security tags attached to the purchased products trigger an alarm at a retail store's exit. For tag deactivation, some retailers have a deactivation device tied to a fixed POS.

Illustrative Systems

Referring now to FIG. 1, there is provided a schematic illustration of an illustrative system 100. System 100 is generally configured to allow an individual to purchase an article 102 using a Mobile Communication Device ("MCD") 104 and to have a security tag 132 detached from the article 102 using a tag detacher 190. Security tags are well known in the art, and therefore will not be described here in detail. Any known or to be known security tag can be used herein without limitation. For example, the security tag 132 comprises a tag having part number ZL303-G-100 and which is available from Tyco Retail Solutions (part of Johnson Controls) of Boca Raton, Fla. The tag is designed to be used with a tack that is inserted through an article and into the security tag. The tack has a novel architecture that facilitates the automated detachment of the security tag 132 from the article. This novel architecture of the tack will be described in detail below.

The tag detacher 190 is configured to facilitate (A) the detachment of the security tag 132 from the article 102 in accordance with the conventional probe technique described in the background section of this paper and/or (B) the detachment of the security tag 132 from the article 102 in accordance with a novel pin head removal technique. This novel pin head removal technique will be discussed in detail below.

The tag detacher 190 employs wireless SRC technologies to facilitate the purchase of the article 102 and/or the detachment of the security tag 132 from the article 102. The wireless SRC technologies can include, but are not limited to, Near Field Communication ("NFC") technology, InfRared ("IR") technology, Wireless Fidelity ("Wi-Fi") technology, Radio Frequency Identification ("RFID") technology, and/or ZigBee technology. The tag detacher 190 may also employ barcode technology, electronic card reader technology, and Wireless Sensor Network ("WSN") communications technology.

As shown in FIG. 1, system 100 comprises a Retail Store Facility ("RSF") 150 including an EAS system 130. The EAS system 130 comprises a monitoring system 134 and at least one security tag 132. Although not shown in FIG. 1, the security tag 132 is attached to article 102, thereby protecting the article 102 from an unauthorized removal from the retail store facility 150. The monitoring system 134 establishes a surveillance zone (not shown) within which the presence of the security tag 132 can be detected. The surveillance zone is established at an access point (not shown) for the retail store facility 150. If the security tag 132 is carried into the surveillance zone, then an alarm is triggered to indicate a possible unauthorized removal of the article 102 from the retail store facility 150.

During store hours, an individual 140 may desire to purchase the article 102. The individual 140 can purchase the article 102 without using a traditional fixed POS station (e.g., a checkout counter). Instead, the purchase transaction can be achieved using MCD 104. MCD 104 (e.g., a mobile phone or tablet computer) can be in the possession of the individual 140 or store associate 142 at the time of the purchase transaction. Notably, MCD 104 has a retail transaction application installed thereon that is configured to facilitate the purchase of article 102 and the management/control of the tag detacher operations for an attachment/detachment of the security tag 132 to/from article 102. The retail transaction application can be a pre-installed application, an add-on application or a plug-in application. Retail transaction applications are well known in the art, and therefore will not be described in detail herein. Any known or to be known retail transaction application can be used herein without limitation.

In order to initiate a purchase transaction, the retail transaction application is launched via a user-software interaction. The retail transaction application facilitates the exchange of data between the article 102, security tag 132, individual 140, store associate 142, and/or Retail Transaction System ("RTS") 118. For example, after the retail transaction application is launched, a user 140, 142 is prompted to start a retail transaction process for purchasing the article 102. The retail transaction process can be started simply by performing a user software interaction, such as depressing a key on a keypad of the MCD 104 or touching a button on a touch screen display of the MCD 104.

Subsequently, the user 140, 142 may manually input into the retail transaction application article information. Alternatively or additionally, the user 140, 142 places the MCD 104 in proximity of article 102. As a result of this placement, the MCD 104 and/or tag detacher 190 obtains article information from the article 102. The article information includes any information that is useful for purchasing the article 102, such as an article identifier and an article purchase price. In some scenarios, the article information may even include an identifier of the security tag 132 attached thereto. The article information can be communicated from the article 102 to the MCD 104 and/or tag detacher 190 via a short range communication, such as a barcode communication 122 or an NFC 120. In the barcode scenario, article 102 has a barcode 128 attached to an exposed surface thereof. In the NFC scenarios, article 102 may comprise an NFC enabled device 126. If the tag detacher 190 obtains the article information, then it forwards it to MCD 104 via a wireless SRC, such as a Bluetooth communication.

Thereafter, payment information is input into the retail transaction application of MCD 104 by the user 140, 142. Upon obtaining the payment information, the MCD 104 automatically performs operations for establishing a retail transaction session with the RTS 118. The retail transaction session can involve: communicating the article information and payment information from MCD 104 to the RTS 118 via an RF communication 124 and public network 106 (e.g., the Internet); completing a purchase transaction by the RTS 118; and communicating a response message from the RTS 118 to MCD 104 indicating that the article 102 has been successfully or unsuccessfully purchased. The purchase transaction can involve using an authorized payment system, such as a bank Automatic Clearing House ("ACH") payment system, a credit/debit card authorization system, or a third party system (e.g., PayPal®, SolidTrust Pay® or Google Wallet®).

The purchase transaction can be completed by the RTS 118 using the article information and payment information. In this regard, such information may be received by a computing device 108 of the RTS 118 and forwarded thereby to a sub-system of a private network 100 (e.g., an Intranet). For example, the article information and purchase information can also be forwarded to and processed by a purchase sub-system 112 to complete a purchase transaction. When the purchase transaction is completed, a message is generated and sent to the MCD 104 indicating whether the article 102 has been successfully or unsuccessfully purchased.

If the article 102 has been successfully purchased, then a security tag detaching process can be started automatically by the RTS 118 or by the MCD 104. Alternatively, the user 140, 142 can start the security tag detaching process by performing a user-software interaction using the MCD 104. In all three scenarios, the article information can optionally be forwarded to and processed by a lock release sub-system 114 to retrieve a detachment key or a detachment code that is useful for detaching the security tag 132 from the article 102. The detachment key or code is then sent from the RTS 118 to the MCD 104 such that the MCD 104 can perform or cause the tag detacher 190 to perform tag detachment operations. The tag detachment operations are generally configured to cause the security tag 132 to actuate a detaching mechanism (not shown in FIG. 1). In this regard, the MCD or tag detacher generates a detach command and sends a detach signal including the detach command to the tag detacher 190. The tag detacher 190 authenticates the detach command and activates the detaching mechanism (e.g., a probe or magnet). For example, the detach command causes: (a) a detachment mechanism to enter an insert space formed in the housing of the security tag 132, travel through an arcuate channel towards a securement mechanism, engage the securement mechanism, and apply a pushing force on the securement mechanism; (b) a magnetic field to be applied to the tack of the security tag 132 for releasing a tack head from an elongate pin; and/or (c) an external grasping mechanism to grasp the tack head and pull the same in a direction away from the tag body. Once the security tag 132 has been removed from article 102, the customer 140 can carry the article 102 through the surveillance zone without setting off the alarm.

Referring now to FIGS. 2-7, there is provided schematic illustrations useful for understanding operations of the security tag 132. Security tag 132 is described below as a security tag with a clamping securement mechanism that is actuated using a tool inserted into the security tag's housing. The present solution is not limited to such security tag configurations. The present solution can be used with any other type of security tag architecture.

As shown in FIGS. 2-7, the security tag 132 includes a tag body 202 formed of a housing 310 with an upper housing member 304 joined to a lower housing member 306. The housing members 304, 306 can be joined together via an adhesive, a mechanical coupling means (e.g., snaps, screws, etc.), or a weld (e.g., an ultrasonic weld). The housing 310 can be made from a rigid or semi-rigid material, such as plastic. The housing 310 has an opening 206 formed therein such that at least a portion of a tack assembly 204 (or attachment element) can be inserted into the security tag for facilitating the attachment of the security tag to an article 102 (e.g., a piece of clothing). EAS and/or RFID components (not shown) is (are) contained within the housing 310. EAS and RFID components of security tags are well known in the art, and therefore will not be described herein. Any known or to be known EAS and/or RFID component can be used herein without limitation.

Tack assembly 204 has a tack head 210 and an elongate tack body 208 extending down and away from the tack head. The tack body 208 is sized and shaped for insertion into opening 206 and removal from opening 206. A plurality of grooves 214 is formed along a length of the tack body 208 for engagement with a securement mechanism 406 disposed within the housing 310. When the grooves are engaged by the securement mechanism 406, the security tag 132 is secured to the article 102. Thereafter, unauthorized removal of the article 102 from a controlled area (e.g., RSF 150 of FIG. 1) can be detected by a monitoring device of the EAS system 130. Such monitoring devices are well known in the art, and therefore will not be described herein. Still, it should be understood that at least one sensor (not shown in FIGS. 1-5) is disposed within the housing 310. The sensor includes, but is not limited to, an acoustically resonant magnetic sensor. In all cases, the sensor generates signals which can be detected by the monitoring device.

Such detection occurs when the security tag 132 is present within a surveillance zone (or interrogation zone) established by the monitoring system 134. The surveillance zone (or interrogation zone) is usually established at an access point for the controlled area (e.g., adjacent to a retail store entrance and/or exit). If the article 102 enters the surveillance zone (or interrogation zone) with the security tag 132, then an alarm may be triggered to indicate possible unauthorized removal thereof from the controlled area. In contrast, if the article 102 is authorized for removal from the controlled area, then the security tag 132 thereof can be deactivated and/or detached therefrom using a detachment mechanism (e.g., a probe 302 or a magnet (not shown)) of the tag detacher 190. Consequently, the article 102 can be carried through the surveillance zone (or interrogation zone) without being detected by the monitoring system 134 and/or without triggering the alarm.

The probe 302 is sized and shaped to at least be partially slidingly inserted into and removed from an insert space 308 formed in the housing 310. When inserted into insert space 308, the probe 302 travels through an arcuate channel 502 so as to be guided towards the securement mechanism 406. In this regard, the probe 302 has a generally arcuate shape matching that of the arcuate channel 502. Upon engagement with the securement mechanism 406, the probe 302 releases the tack body 208 therefrom. Next, the tack body 208 can be removed from the housing, so as to decouple the security tag 132 from the article 102.

Figure 5:
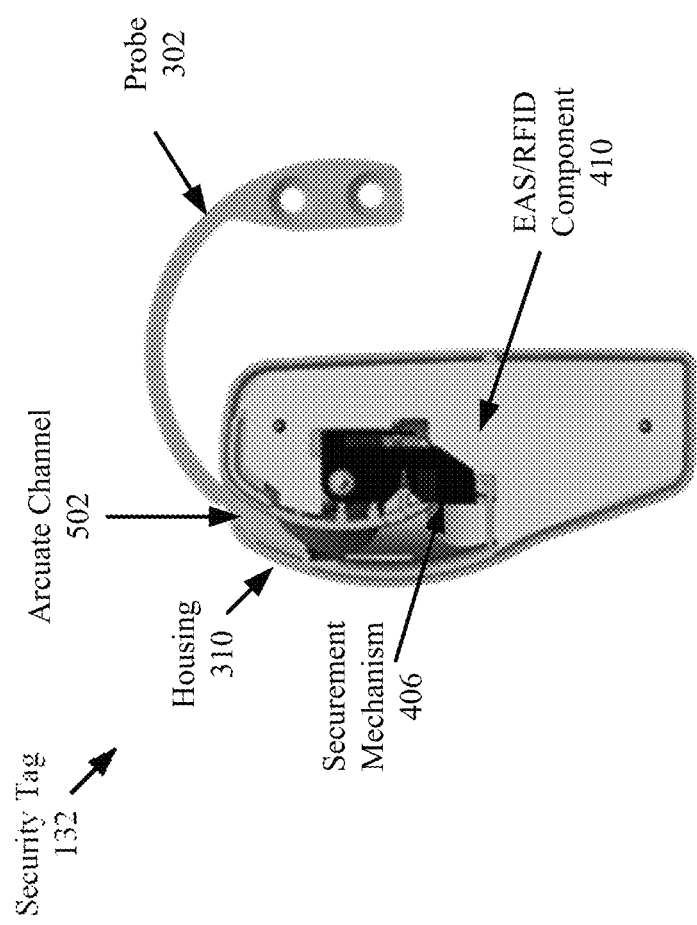
FIGS. 5-6 provide illustrations that are useful for understanding how the tack assembly can be released using a detachment mechanism.
Figure 6:
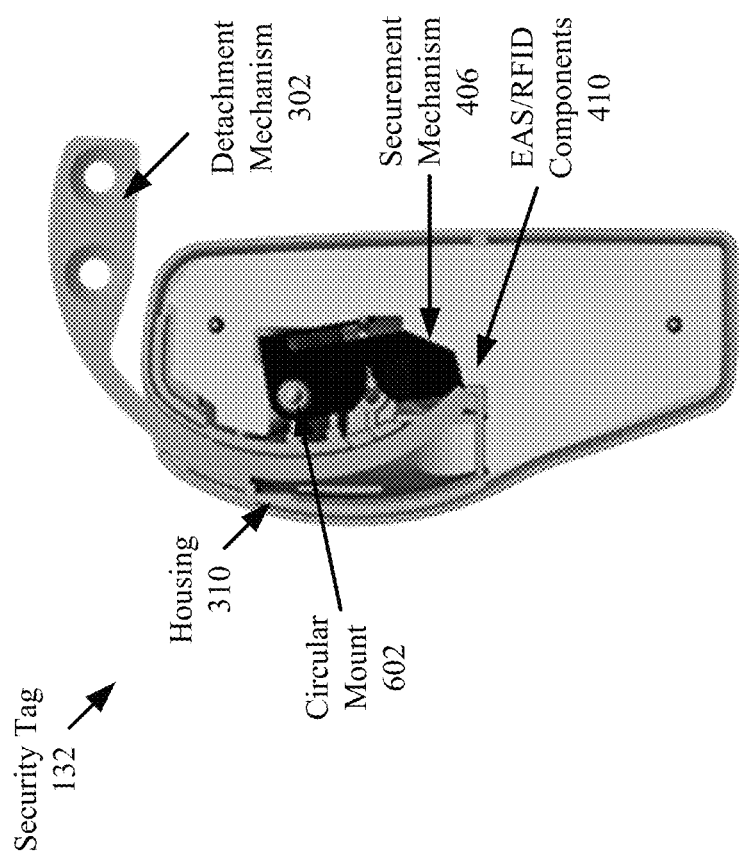
Figure 7:
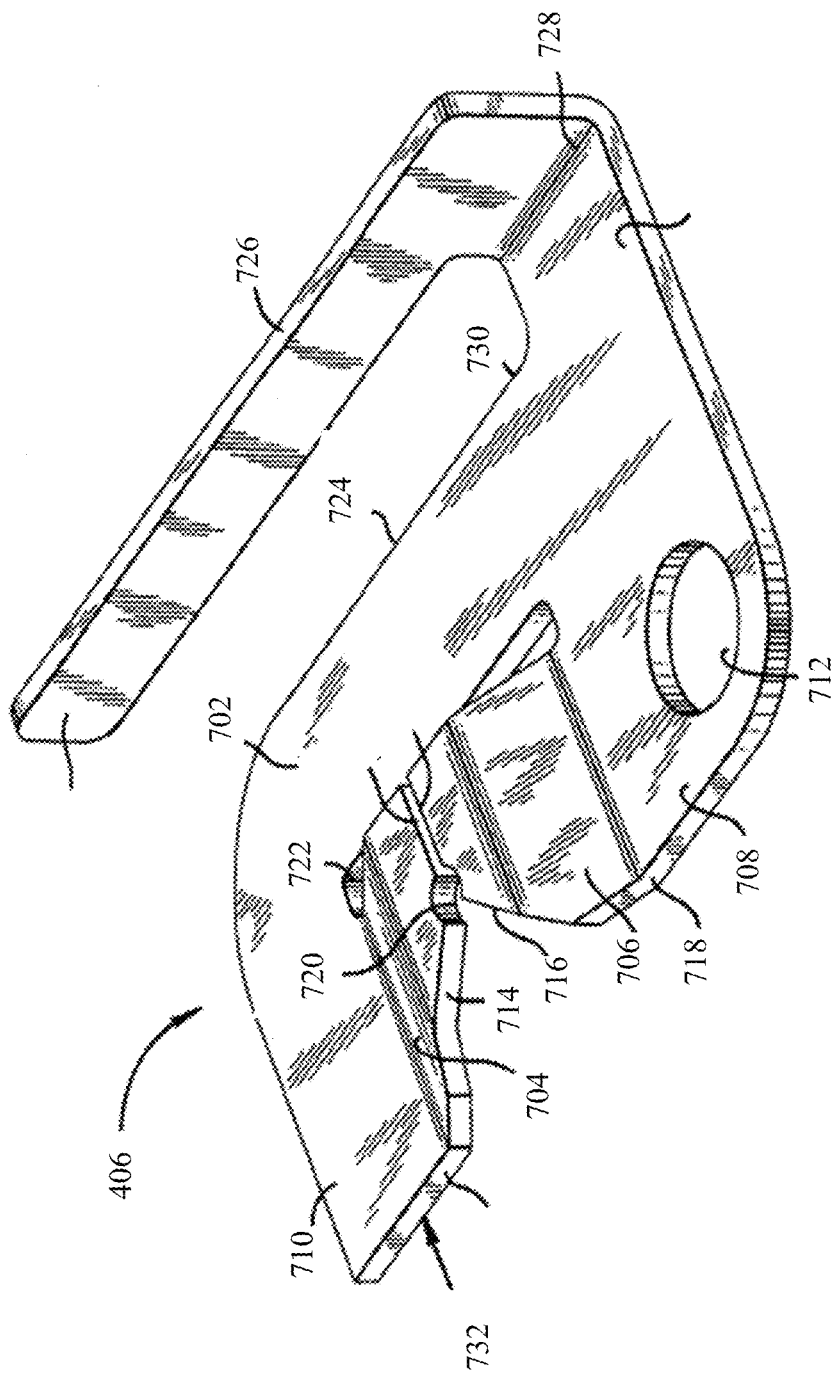
FIG. 7 is an illustration of a securement mechanism.
Figure 8:
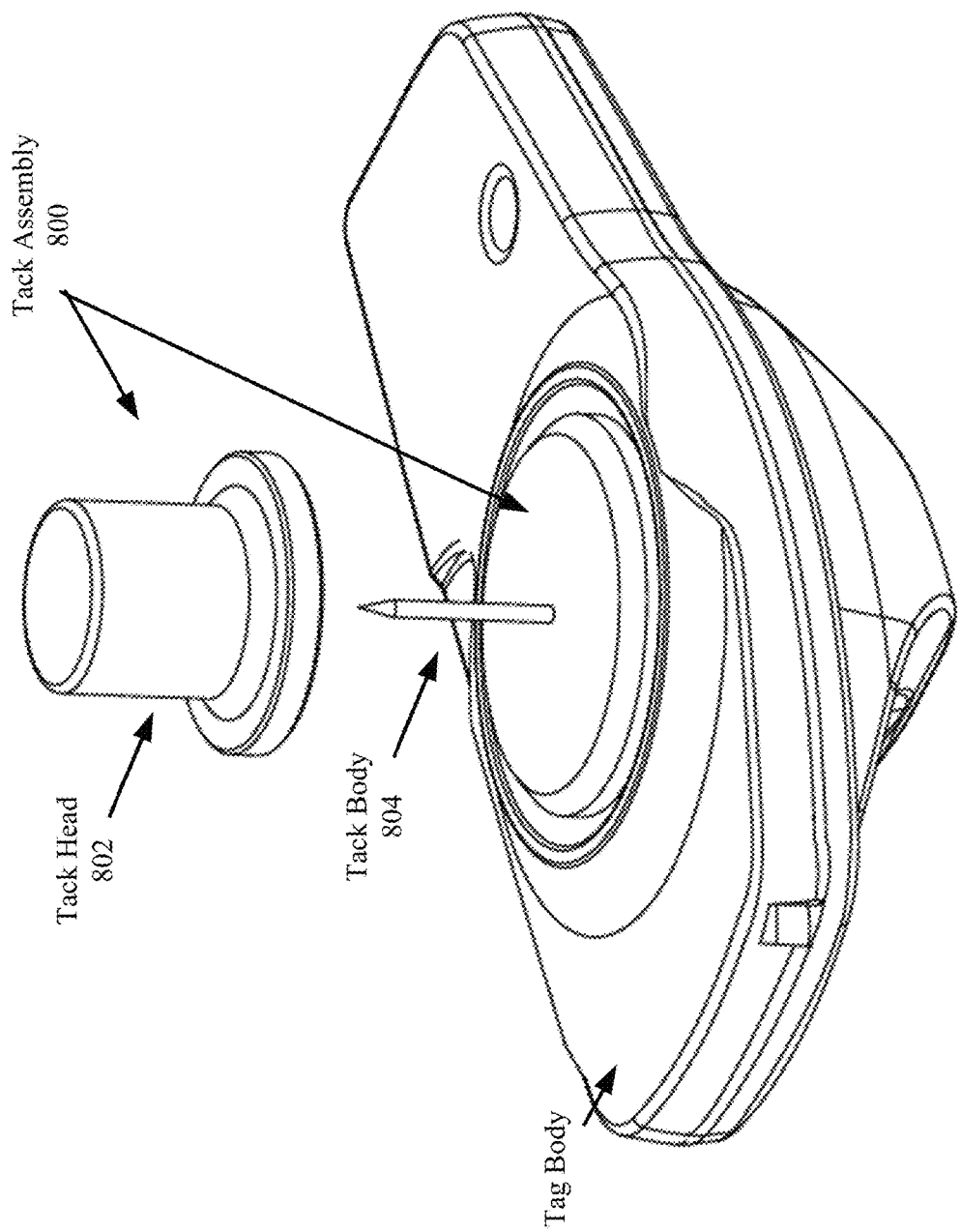
FIG. 8 is a perspective view of an illustrative security tag being used with a novel tack assembly.

A schematic illustration of the securement mechanism 406 is provided in FIG. 7. As noted above, the securement mechanism 406 is specifically adapted to accommodate release of the tack body 208 via the arcuate probe 302 moving in the arcuate channel 502. The securement mechanism 406 is generally in the form of a spring clamp securely disposed within the housing 310 of the security tag so as to be pivotable (or rotatable) about an axis 408. In this regard, the spring clamp comprises a clamp body 702 and jaws 704, 706. The clamp body 702 includes a mounting part 708 extending laterally of jaw 706 and a release part 710 extending laterally of jaw 704. The mounting part 708 includes a mounting aperture 712 facilitating the pivotable movement of the securement mechanism 406 within the housing of the security tag. The pivotable movement allows the securement mechanism 406 to be transitioned by the arcuate probe 302 from a first position in which the tack assembly is locked thereto (as shown in FIG. 5) and a second position in which the tack assembly is released or unlocked therefrom (as shown in FIG. 6).

Each of the jaws 704, 706 extends outwardly of the plane of the clamp body 702 and then inwardly toward the other jaw. The jaws 704, 706 terminate in facing edges 714, 716. These edges extend from a common edge 718 of the clamp body 702 inwardly toward each other, then curve outwardly away from each other to define an aperture 720 (typically, circular or elliptical) for receiving the tack body 208. The edges 714, 716 then continue in aligned fashion and end in an elongated, lateral slot 722 in the clamp body 702. The lateral slot lies inward of a further clamp body edge 724 which opposes the clamp body edge 718.

A further laterally extending elongated spring sleeve 726 is attached by a joint area 728 to the side 730 of the edge 724 bordering the mounting part 708. The sleeve 726 extends along the length of the edge 724 and is also out of the plane of the clamp body 702.

For mounting and supporting the spring clamp 702, the lower housing member 306 of the security tag 132 includes a circular mount 602. The spring clamp 406 is mounted, via aperture 712 of the mounting part 708, on the circular mount 602. In this way, the mounting part 708 can be rotated about the circular mount 602. The spring clamp 702 is thus able to pivot about the mounting part 708.

When an end of the tack assembly 204 is introduced in the downward direction through the opening 206 in the upper housing member 304, the tack body 208 is directed to aperture 720 of the securement mechanism 706. This causes the jaws 704, 706 to spread open and allow the tack body 208 to pass there through.

When the downward movement of the tack assembly 204 is stopped, the jaws 704, 706 retract and clutch the tack body 208. In this position, the jaws 704, 706 prevent upward movement of the tack assembly 204. As such, the security tag 132 becomes securely coupled to the article 102.

In order to release the tack body 208 from the jaws 704-706, the probe 302 is introduced into the insert space 308 formed in the housing 310 of the security tag 132. Rotation of the probe 302 causes it to be moved in and guided by the arcuate channel 502 until the end 312 abuts portion 732 of the securement mechanism 406. Continued rotational movement of the probe 302 causes force to be applied to portion 732 of the securement mechanism 406. This force, in turn, causes the clamp body 702 to rotate about the support area 708. The jaw 704 is thus enabled to spread away from jaw 706 due to the force of the tack body 208, which is being held stationary by jaw 706. As a result, aperture 720 expands, releasing the tack body 208 from the clutch of the jaws. The tack assembly 204 can now be moved in the upward direction past the jaws, via an upward force on the tack head 210.

During rotation of the clamp body 702, the spring sleeve 726 at the joint area 728 is compressed. After the tack assembly 204 is separated from the housing 310, the probe 302 is rotated in the reverse direction. This reverse rotation disengages the probe 302 from the securement mechanism 406. Consequently, the spring sleeve 726 rotates in an opposite direction so as to be brought back to its original position. Thereafter, the probe 302 is guided out of the arcuate channel 502 and is removed from insert space 312 formed in the housing 310.

As evident from the above discussion, the probe 302 is provided to deflect the securement mechanism 406 so as to allow the tack assembly 204 to be removed from the housing 310. The probe 302 is part of the external tag detacher 190. When the tack assembly 204 is removed from the housing 310, the security tag 132 can be decoupled from an article 102 (e.g., a piece of clothing).

As noted above, the security tag 132 can additionally or alternatively be decoupled from the article 102 via a novel pin head removal process. In this regard, it should be understood that the security tag 132 can be used with a conventional tack assembly 204 (or attachment element) shown in FIGS. 3-7 and/or one of the novel tack assemblies 800 shown in FIGS. 8-17.

As shown in FIGS. 8-11, the tack assembly 800 comprises a tack head 802 and a tack body 804. The tack head 802 is designed such that it can be selectively coupled to the tack body 804 and selectively decoupled from the tack body 804. In this regard, the tack head 802 comprises a cap 926 with a securement mechanism 924 disposed in an internal cavity 928 thereof. The securement mechanism 924 includes, but is not limited to, a spring and/or a clamping mechanism (e.g., a ball clamp or clutch). The clamping mechanism is configured to captivate a top portion 906 of the tack body 804 in the tack head 802.

The tack body 804 is formed of a pin 902 and a stop 904 disposed on the pin 902. The pin 902 is double-sided so that (A) the tack head 802 can be selectively coupled to a first end 906 thereof and (B) the tag body 900 can be selectively coupled to a second end 908 thereof. Notably, the top end portion 906 has a smaller diameter than a bottom end portion 908 of the tack body 804. In this way, the tack assembly 800 can be used with different types of items including delicate garments.

The first end 906 is sized and shaped for insertion into an aperture 922 formed in the tack head 802. The stop 904 provides a way to ensure that the pin 902 can only be inserted into the tack head 802 by a certain amount. The stop 904 also provides a means to ensure that damage of a delicate item does not occur from the insert space 914 when clamped between the tack assembly 800 and the tag body 900 using the top portion 906 of the tack body 804.

When the pin 902 is fully inserted into the aperture 922, the securement mechanism 924 of the tack head 802 is actuated so that it engages the pin 902. As a result of the securement mechanism's engagement with the pin, the tack head 802 is securely coupled to the pin 902. The pin 902 is released from the securement mechanism 924 via the application of a magnetic field to the tack head 802. The magnetic field can be applied by a tag detacher (e.g., tag detacher 190 of FIG. 1 and/or the dynamic magnetic detacher described in U.S. Pat. No. 9,850,688 to Stewart et al.).

In some scenarios, a user manually removes the tack head 802 from the pin 902. In other scenarios, an external grasping mechanism is provided to grasp the tack head 802 and pull the same away from the pin 902. Grasping mechanisms are well known in the art, and therefore will not be described herein. Any known or to be known grasping mechanism can be used herein without limitation. For example, the grasping mechanism comprises an articulating and/or telescoping arm with a gripper at a free end thereof. One or more detents, notches, protrusions, ledges, flanges, rubber surface material, or other grasping structure/material (not shown) can be provided on an external surface 1100 of the tack head 802 to facilitate grasping and/or gripping by the grasping mechanism.

The second end 908 opposes the first end 906, and has a plurality of notches 910 formed thereon. The notches 910 are spaced apart from each other. The notches 910 provide specific areas on the pin 902 that can be engaged by the securement mechanism 912 (which is the same as or similar to the securement mechanism 406 of FIG. 4). The specific notch that is engaged by the securement mechanism 912 depends on the thickness of the article disposed in the insert space 914. For example, a first notch 916 is engaged by the securement mechanism 912 when a relatively thin article is disposed in the insert space 914 and provides resistance to further downward movement thereof. In contrast, a second notch 920 is engaged by the securement mechanism 912 when a relatively thick article is disposed in the insert space 914 and provides resistance to further downward movement thereof. The pin's second end 908 can be released from the tag body 900 via an arcuate probe as discussed above. When released, the entire tack assembly 800 can be lifted away from the tag body 900. This lifting can be performed by an operator or alternatively by an external grasping mechanism (e.g., an articulating arm with a gripper).

The present solution is not limited to the tack architecture shown in FIGS. 8-11. For example, a lanyard 1200 shown in FIG. 12 can be provided to couple the tack head to the tag body and/or stop (not shown). Lanyards are well known in the art, and therefore will not be described herein. Any known or to be known lanyard can be used herein without limitation. The lanyard can be configured to cause an alarm issuance or ink release when cut or otherwise tampered with.

Figure 2:
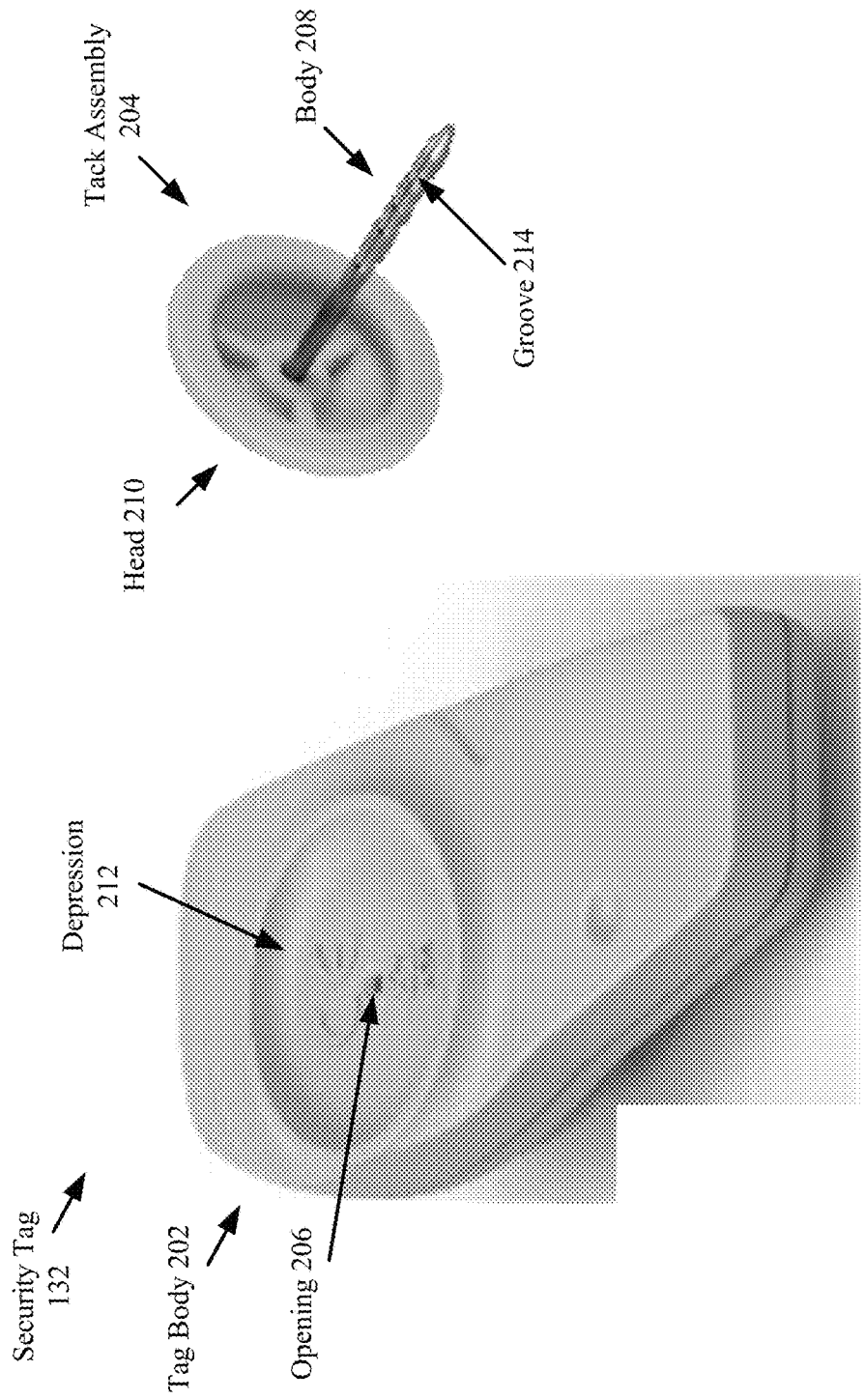
FIG. 2 is an illustration of the security tag with a tack assembly removed therefrom.
Figure 3:
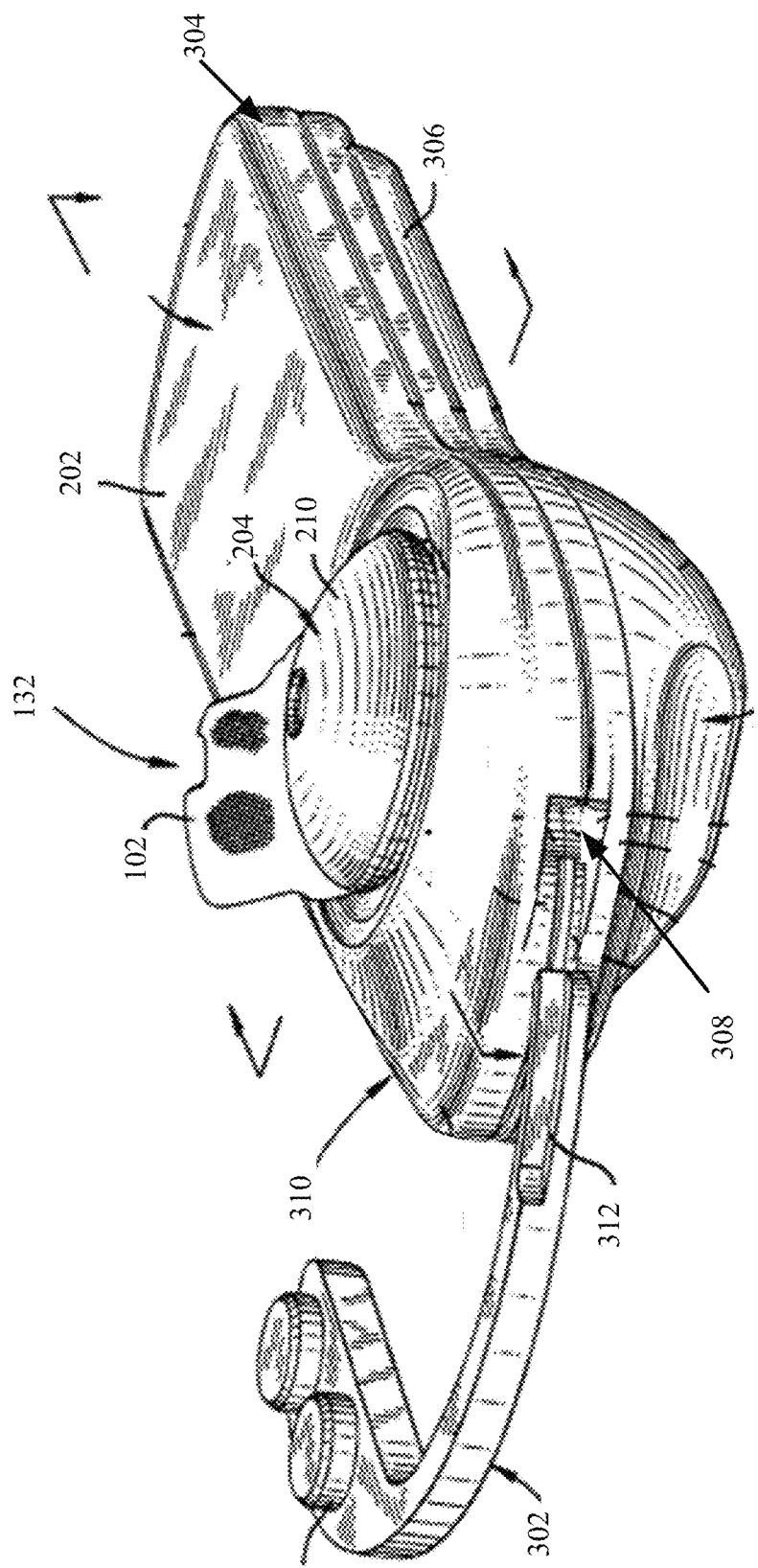
FIG. 3 is an illustration of the security tag with the tack assembly coupled thereto.
Figure 4:
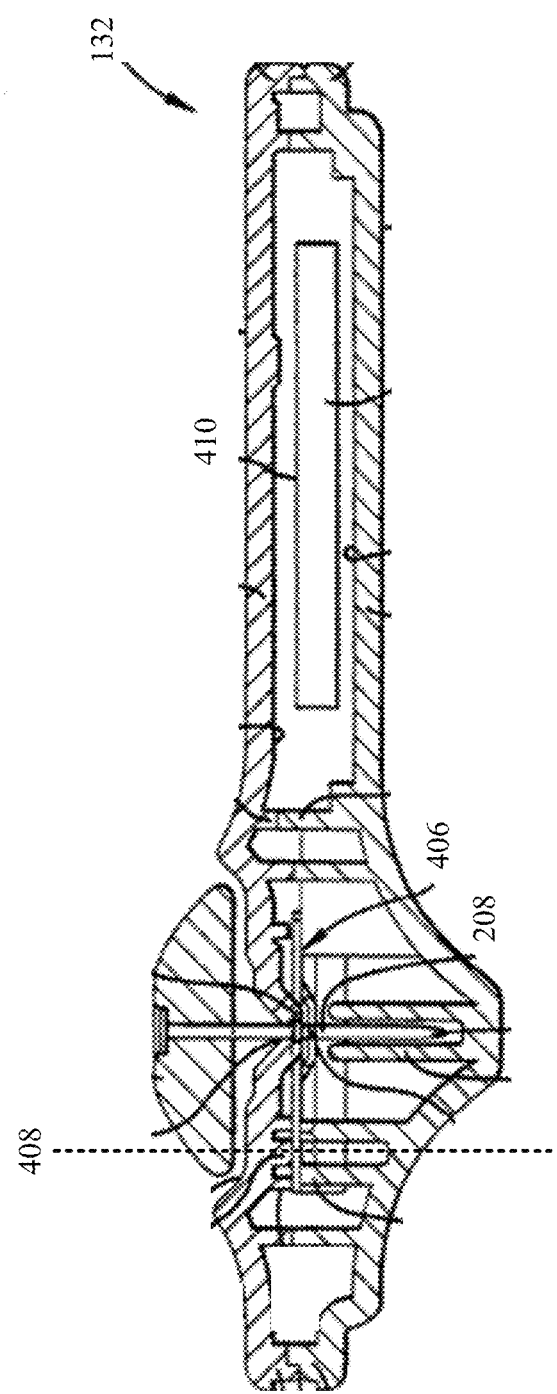
FIG. 4 is a cross sectional view of the security tag with the tack assembly coupled thereto.
Figure 9:
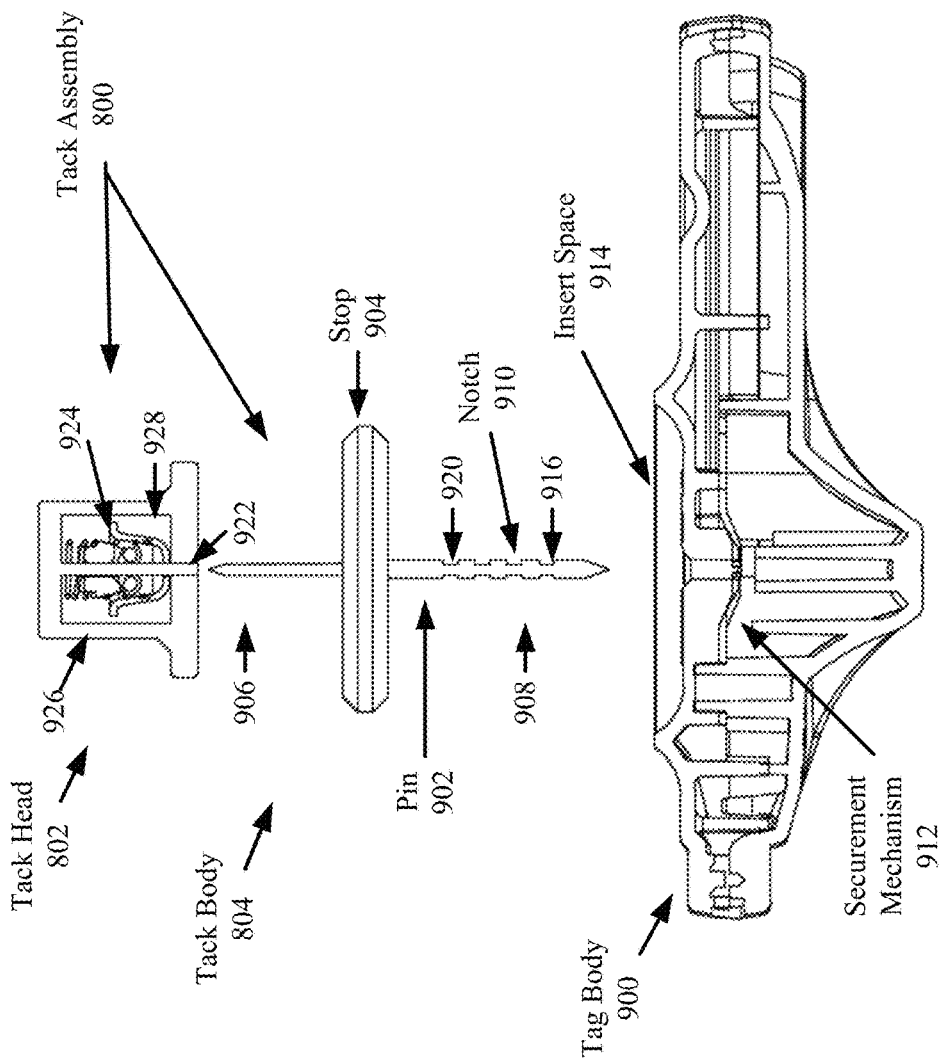
FIG. 9 is a cross-sectional view of the security tag and tack assembly of FIG. 8.
Figure 10:
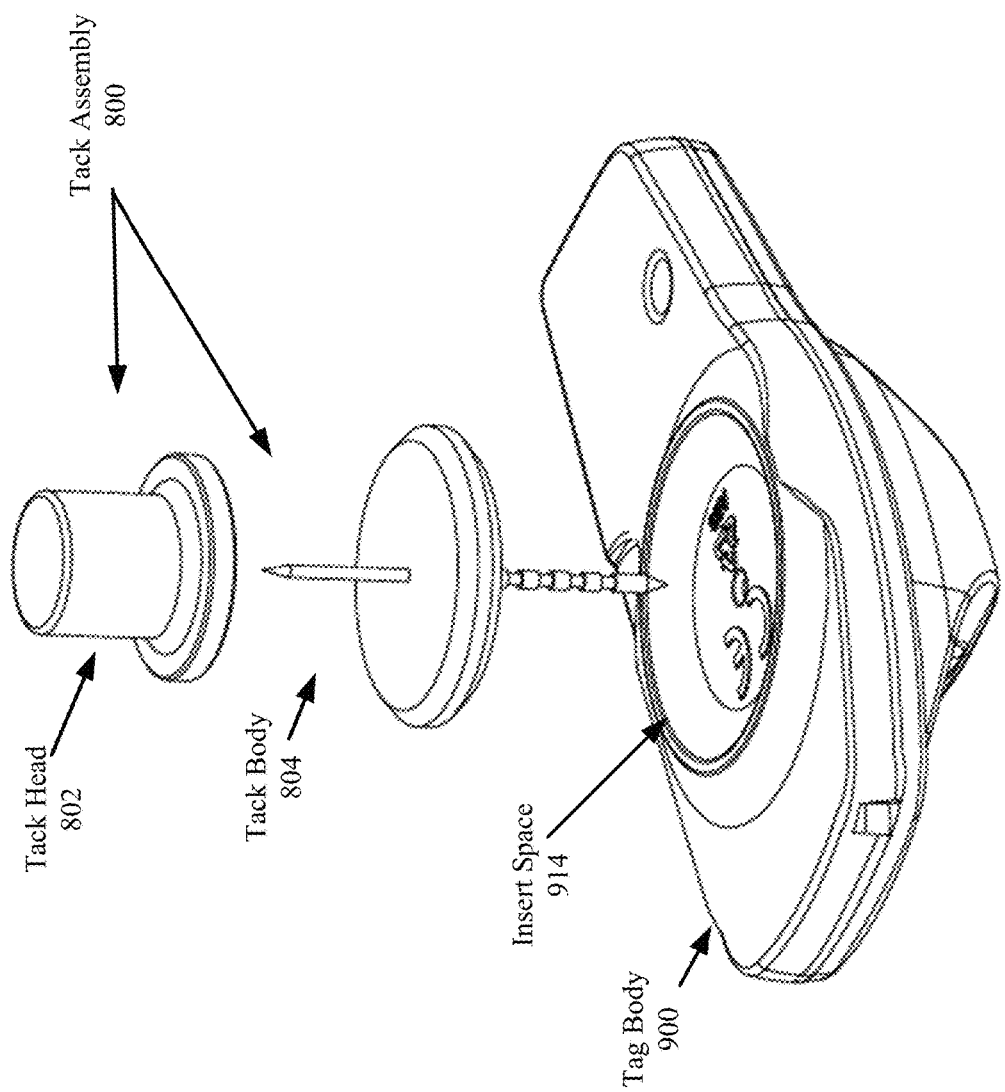
FIG. 10 provides a partial assembly view the tack assembly shown in FIGS. 8-9.
Figure 11:
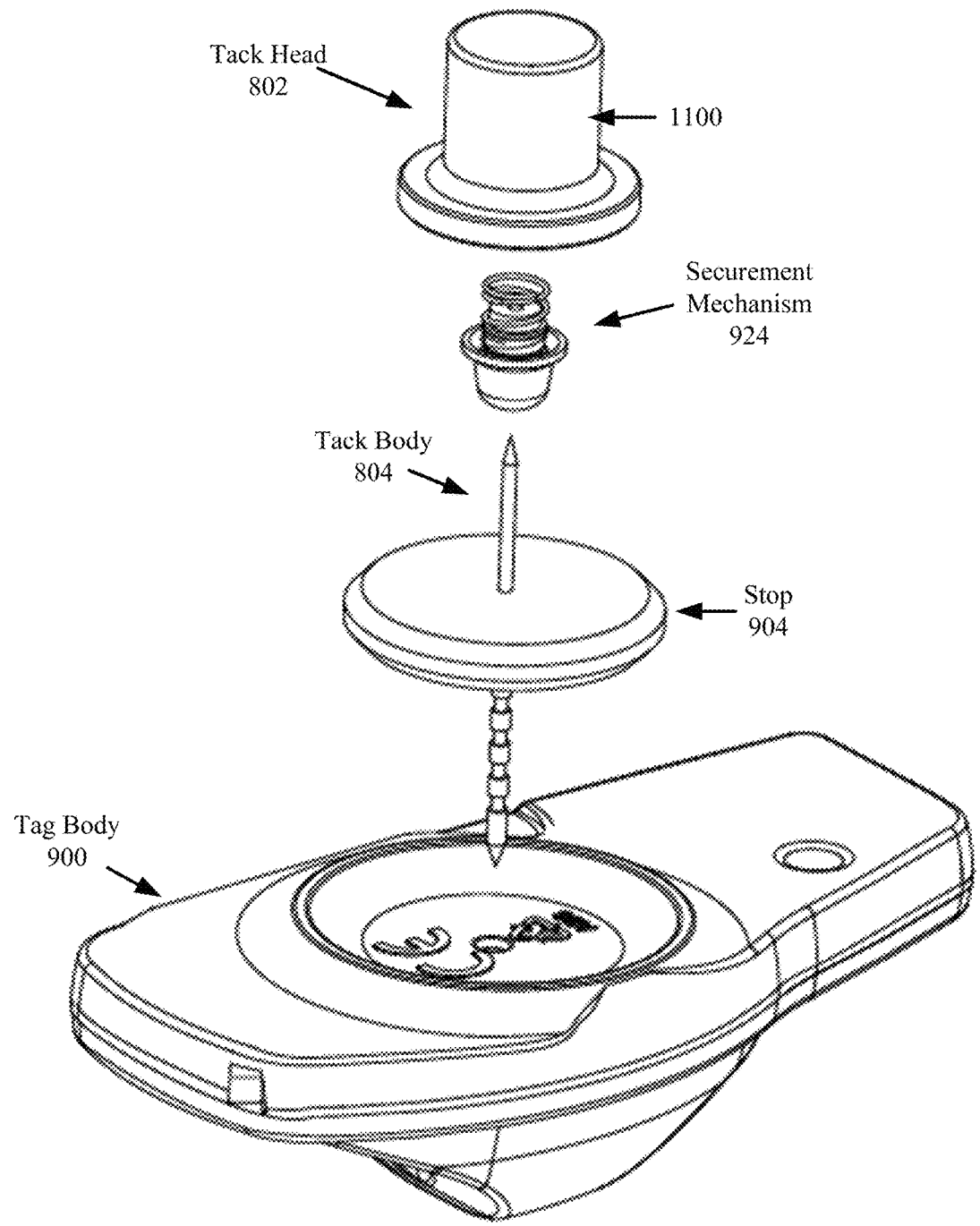
FIG. 11 provides a partial assembly view the tack assembly shown in FIGS. 8-9.
Figure 12:
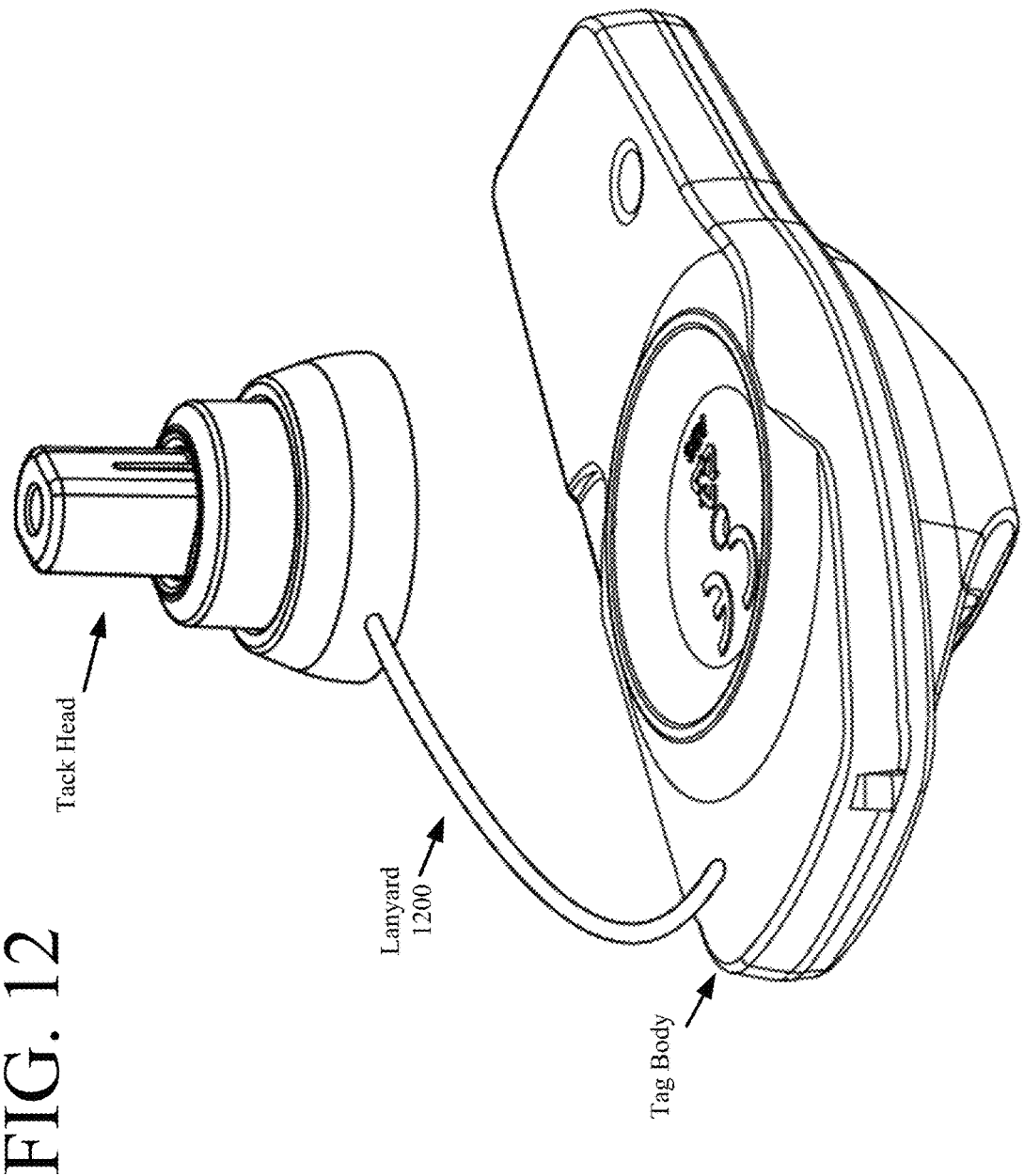
FIG. 12 is an illustration of a security tag having an lanyard coupling a tack head to a tag body.

Referring now to FIGS. 13A-13D, there are provided illustrations that are useful for understanding another illustrative tack assembly 1300 which can be used with a tag body (e.g., tag body 202 of FIG. 2 or 900 of FIG. 9). The tack assembly 1300 comprises a telescoping tack head 1302 and a tack body 1310. The telescoping tack head 1302 comprises a plurality of concentric parts 1304, 1306, 1308 which slide into and out of each other. When slid into each other, the overall size of the telescoping tack head 1302 is reduced. This reduced size of the telescoping tack head 1302 results in a decreased interference with a person's handling of and an aesthetic appeal of an object to which a security tag is attached.

Figure 13C:
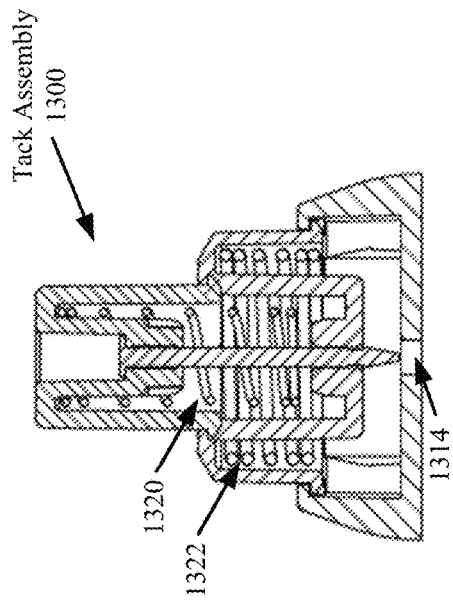
FIGS. 13A-13D (collectively referred to as "FIG. 13") provide illustrations that are useful for understanding another illustrative tack assembly.

The tack body 1310 is securely coupled to the telescoping tack head 1302. This secure coupling can be achieved using any known coupling means, such as an adhesive, mating threads or chemical bond. The tack body 1310 resides within the telescoping tack head 1302 when the concentric parts 1304, 1306, 1308 are fully slid out of each other as shown in FIGS. 13A and 13C. This feature of the tack assembly 1300 reduces the chances that a user will incur an injury from the free sharp end 1312 of the tack body 1310 when the tack assembly 1300 is decoupled from a tag body.

In contrast, a portion 1316 of the tack body 1310 extends through an aperture 1314 formed in the tack head 1302 when the concentric parts 1304, 1306, 1308 are slid into each other as a result of a user's depression thereof. This portion 1316 of the tack body 1310 comprises one or more notches 1318 formed thereon. The notch(es) 1318 provide specific areas on the tack body 1310 that can be engaged by a securement mechanism (e.g., securement mechanism 406 of FIG. 4 or 912 of FIG. 9) of a tag body. This portion 1316 of the tack body 1310 can be released from the tag body via an arcuate probe or other external tool as discussed above.

Figure 13D:
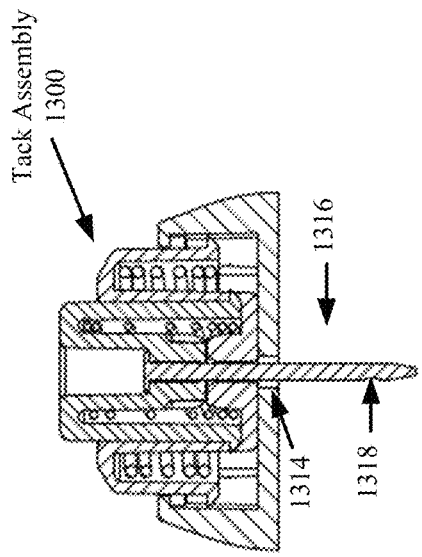
Figure 13A:
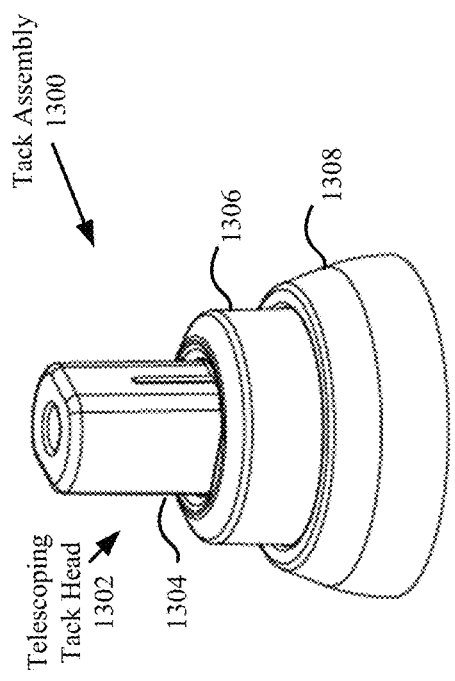
Figure 13B:
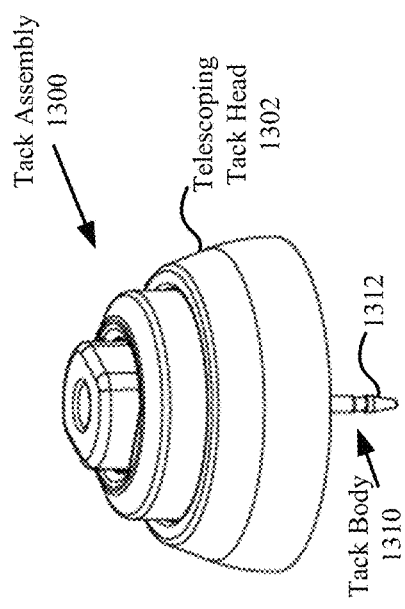
Figure 14C:
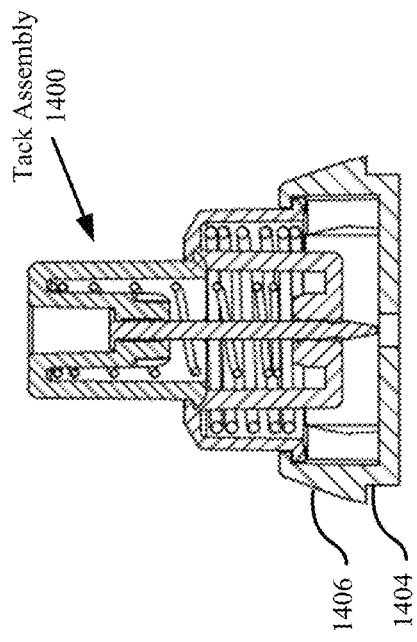
FIGS. 14A-14D (collectively referred to as "FIG. 14") provide illustrations that are useful for understanding another illustrative tack assembly.
Figure 14D:
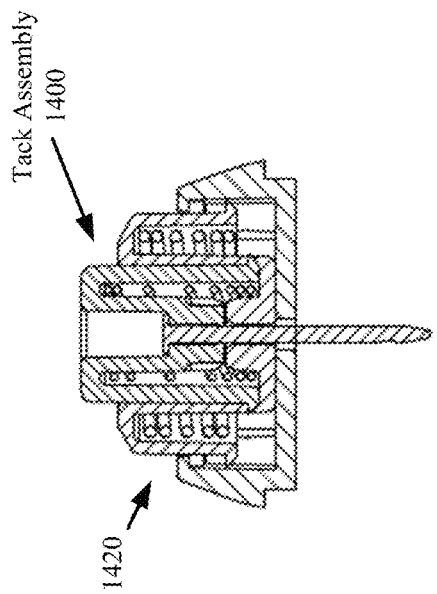
Figure 14A:
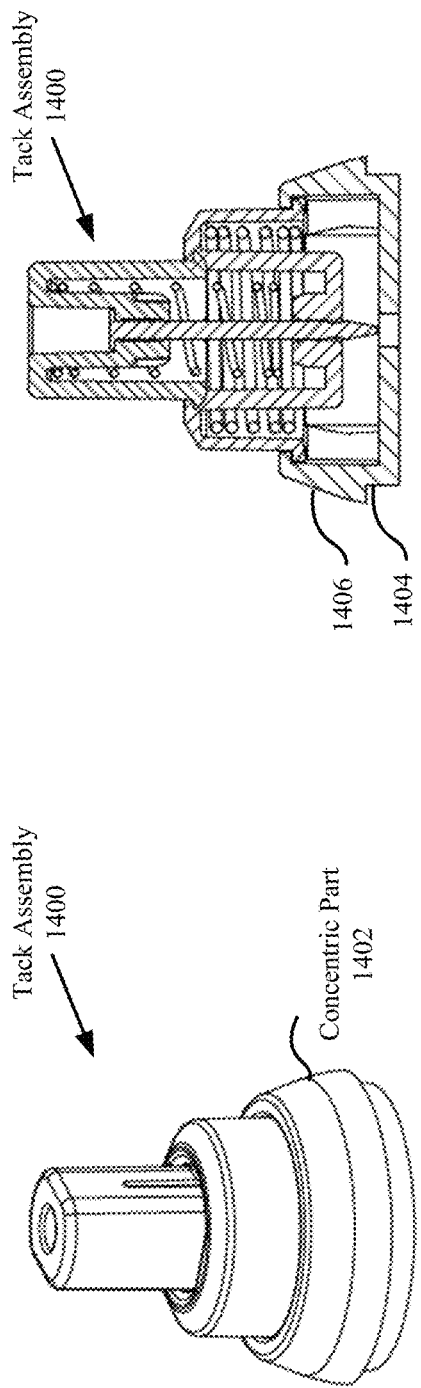
Figure 14B:
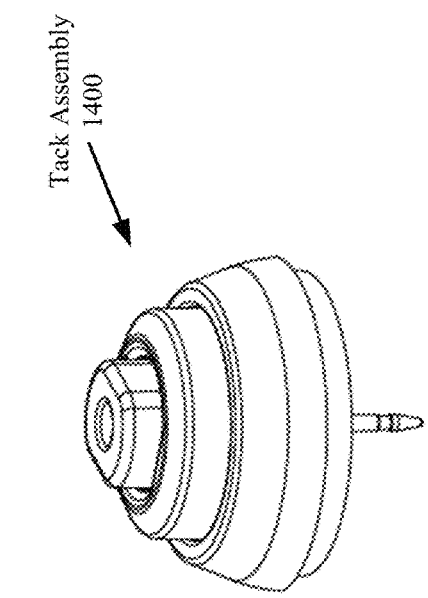

When released, the entire tack assembly 1300 transitions from its engaged position shown in FIGS. 13B and 13D to its unengaged position shown in FIGS. 13A and 13C via springs 1320, 1322. In this regard, it should be understood that the springs 1320, 1322 are normally in an uncompressed state (shown in FIGS. 13A and 13C), but are in their compressed states (shown in FIGS. 13B and 13D) when the concentric parts 1304, 1306, 1308 are slid into each other.

The springs 1320, 1322 are held in their compressed states via the pin's capture by the securement mechanism of the tag body. The spring compression causes the concentric parts 1304, 1306, 1308 to slide out of each other when the tack is released from the tag body so that the tack assembly 1300 automatically returns to its unengaged position.

In some cases, the springs are selected so that the tack assembly 1300 pops up and away from the tag body when the tack is released from the tag body. A magnet may be used here to capture the tack assembly 1300 while in flight via its magnetic attraction with the tack 1310 or other metal component of the tack assembly 1300. The captured tack assembly 1300 can then be placed in a collection bin for later reuse.

Referring now to FIGS. 14A-14D, there are provided illustrations that are useful for understanding another illustrative tack assembly 1400. Tack assembly 1400 is similar to tack assembly 1300, except for the design of a concentric part 1402. Concentric part 1402 is designed to have an indented portion 1404 and flange 1406 for providing a means by which an external mechanism can grasp, grip or grab the tack assembly 1400. The external mechanism can pull tack assembly 1400 in a direction away from the tag body when the tack has been released from the tag body. In some scenarios, this tack architecture is used in self-checkout stations and/or kiosks having an electromechanical component for grasping, griping or grabbing the tack assembly 1400.

Referring now to FIGS. 15A-15D, there are provided illustrations that are useful for understanding another illustrative tack assembly 1500. This tack assembly 1500 is similar to tack assembly 800 described above in relation to FIGS. 8-11 with the exception that the tack head is telescoping.

As shown in FIGS. 15A-15D, the tack assembly 1500 comprises a tack head 1502 and a tack body 1504. The tack head 1502 is designed such that it can be selectively coupled to the tack body 1504 and selectively decoupled from the tack body 1504. In this regard, a securement mechanism 1512 is disposed in an internal cavity 1514 of the tack head 1502. The securement mechanism 1512 includes, but is not limited to, a clamping mechanism (e.g., a ball clamp or clutch). The clamping mechanism is configured to captivate at least a portion of the tack body 1504 in the tack head 1502.

The tack body 1504 is formed of a pin 1516. The pin 1516 is double-sided so that (A) the tack head 1502 can be selectively coupled to a first end 1518 thereof and (B) the tag body (e.g., tag body 202 of FIGS. 2 and 900 of FIG. 9) can be selectively coupled to a second end 1520 thereof. It should be noted that the pin 1516 has a varying diameter. A first end 1518 of the pin 1516 has a diameter smaller than that of a second end 1520 of the pin 1516. This allows the tack assembly 1500 to be used with different types of items (e.g., delicate garments and non-delicate garments).

The first end 1518 is sized and shaped for insertion into an aperture 1522 formed in the tack head 1502. The solid top part 1524 provides a way to ensure that the pin 1516 can only be inserted into the tack head 1502 by a certain amount and cannot be inserted through the tack head 1502 from one side to the other side. When fully inserted into the aperture 1522, the securement mechanism 1512 of the tack head 1502 is actuated so that it engages the pin 1516. As a result of the securement mechanism's engagement with the pin, the tack head 1502 is securely coupled to the pin 1516.

The pin 1516 is released from the securement mechanism 1512 via the application of a magnetic field to the tack head 1502. The magnetic field can be applied by a tag detacher (e.g., tag detacher 190 of FIG. 1 and/or the dynamic magnetic detacher described in U.S. Pat. No. 9,850,688 to Stewart et al.). In some scenarios, a user manually removes the tack head 802 from the pin 902. In other scenarios, an external grasping mechanism is provided to grasp the tack head 1502 and pull the same away from the pin 1516. Grasping mechanisms are well known in the art, and therefore will not be described herein. Any known or to be known grasping mechanism can be used herein without limitation. For example, the grasping mechanism comprises an articulating and/or telescoping arm with a gripper at a free end thereof. One or more detents, notches, protrusions, ledges, flanges, rubber surface materials or other grasping structure/material (not shown) can be provided on an external surface 1526 of the tack head 1502 to facilitate grasping or gripping by the grasping mechanism.

The tack head 1502 comprises telescoping parts 1506, 1508, 1510 that can slide in and out of each other. When slid into each other, the overall size of the telescoping tack head 1502 is reduced. This reduced size of the telescoping tack head 1502 results in a decreased interference with a person's handling of and an aesthetic appeal of an object to which a security tag is attached.

Figure 15A:
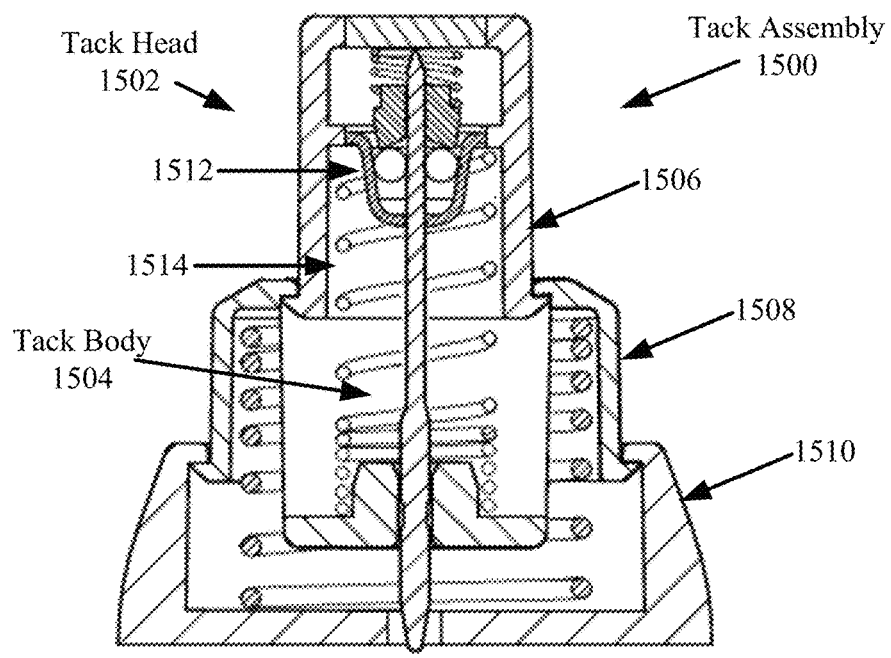
FIGS. 15A-15D ("collectively referred to as "FIG. 15") provide illustrations that are useful for understanding another illustrative tack assembly.

The pin 1516 resides entirely or almost entirely within the telescoping tack head 1502 when the concentric parts 1506, 1508, 1510 are fully slid out of each other as shown in FIG. 15A. This feature of the tack assembly 1500 reduces the chances that a user will incur an injury from the free sharp end 1528 of the tack body 1504 when the tack assembly 1500 is decoupled from a tag body.

In contrast, portion 1520 of the tack body 1504 extends through the aperture 1522 formed in the tack head 1502 when the concentric parts 1506, 1508, 1510 are slid into each other such as by a user's depression thereof. This portion 1520 of the tack body 1504 comprises one or more notches 1530 formed thereon. The notch(es) 1530 provide specific areas on the tack body 1504 that can be engaged by a securement mechanism (e.g., securement mechanism 406 of FIG. 4 or 912 of FIG. 9) of a tag body. This portion 1520 of the tack body 1504 can be released from the tag body via an arcuate probe or other external tool as discussed above.

Figure 15B:
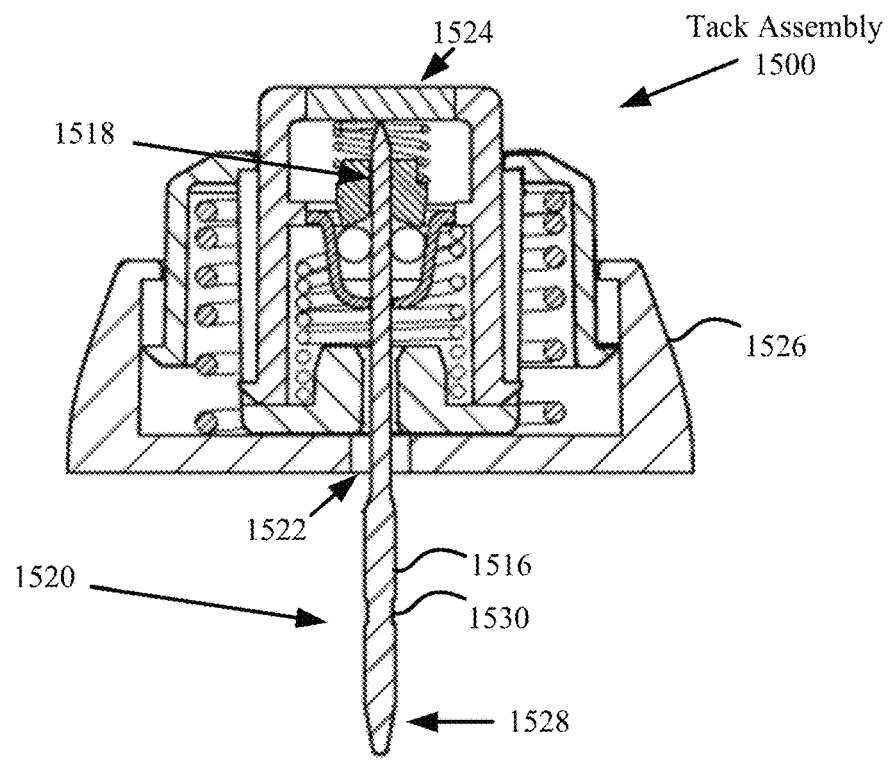
Figure 15C:
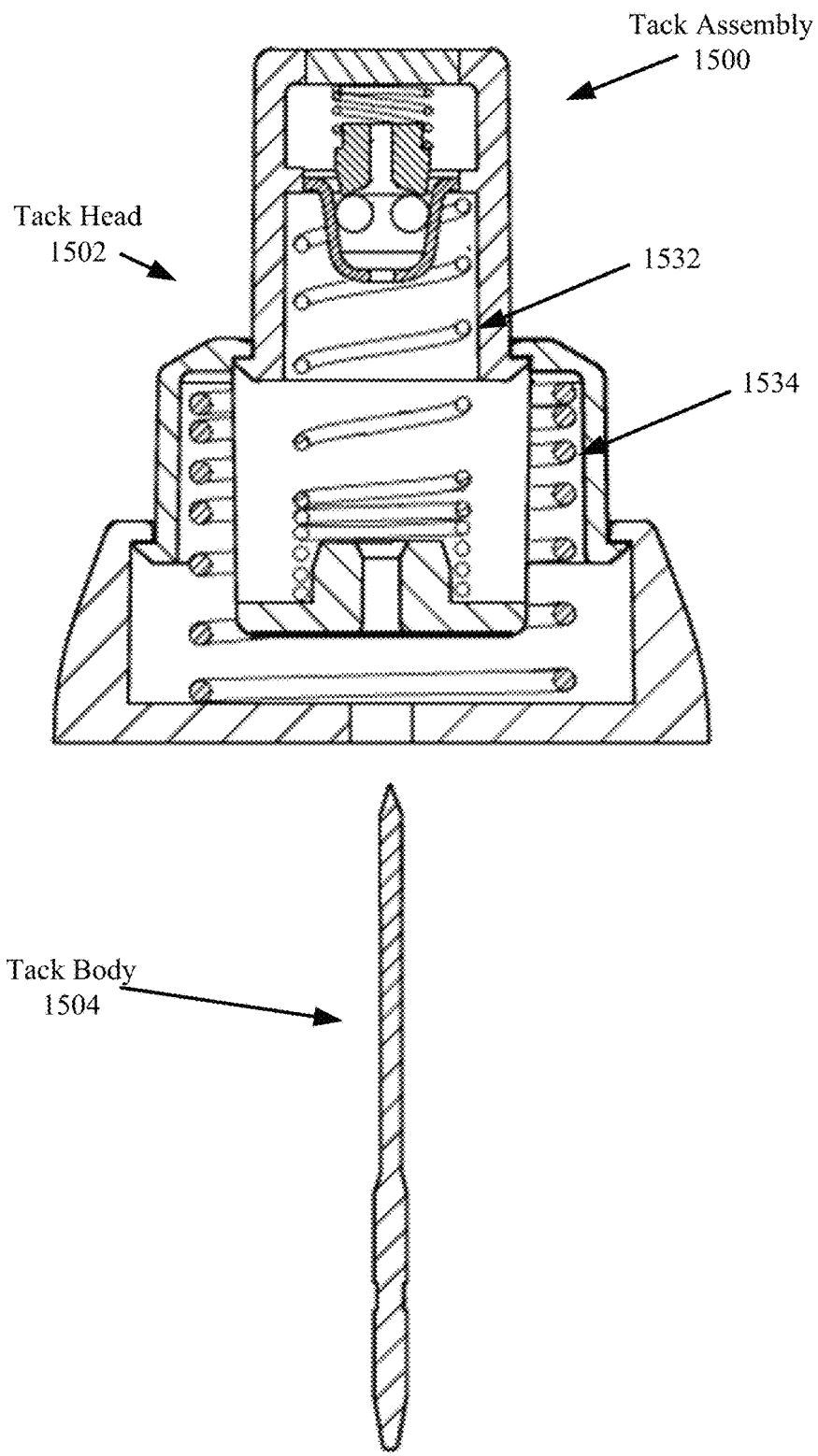
Figure 15D:
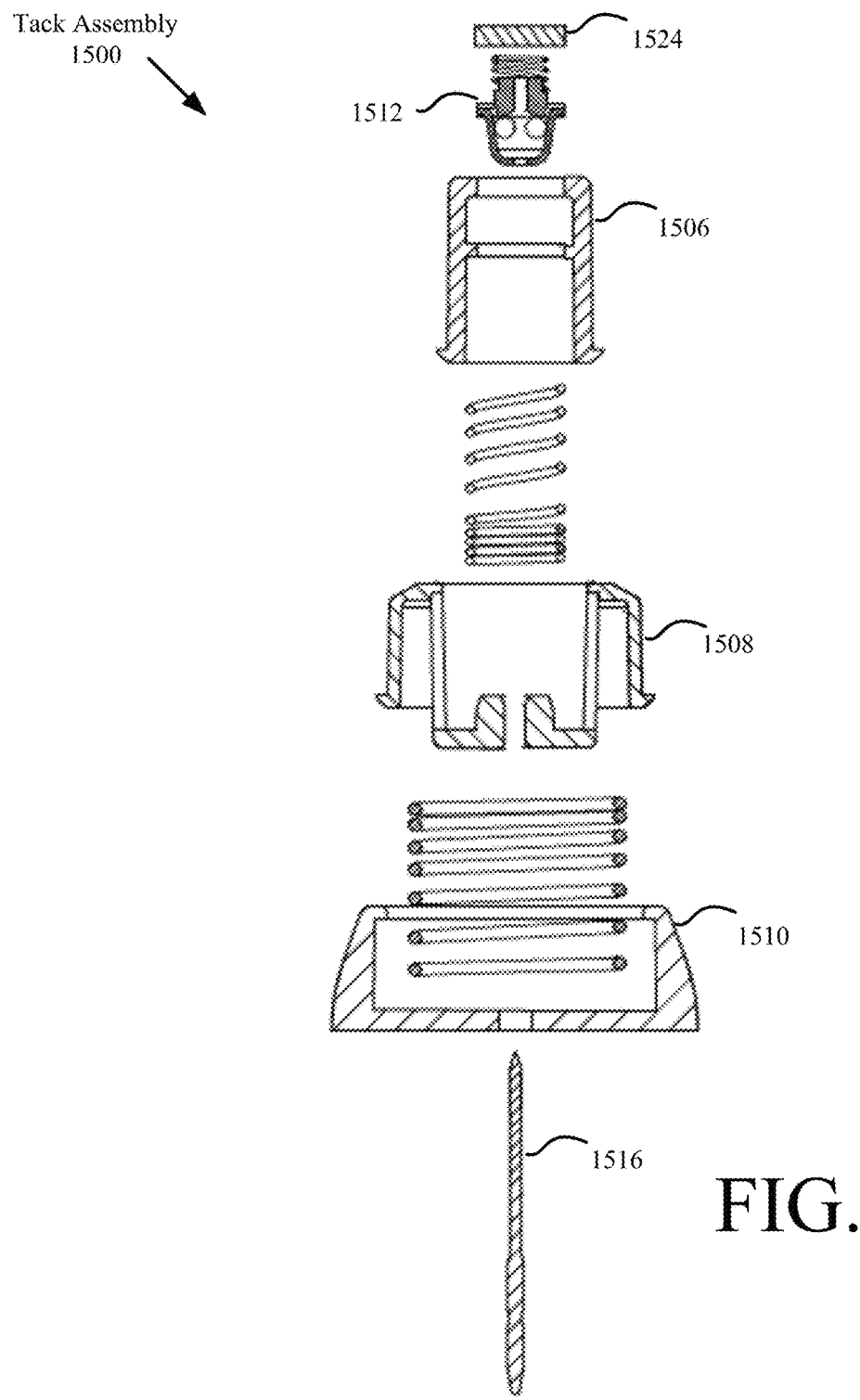

When released from the tag body, the entire tack assembly 1500 transitions from its engaged position shown in FIG. 15B to its unengaged position shown in FIG. 15A via springs 1532, 1534. In this regard, it should be understood that the springs are normally in an uncompressed state (shown in FIG. 15A), but are in their compressed states (shown in FIG. 15B) when the concentric parts 1506, 1508, 1510 are slid into each other. The springs 1532, 1534 are held in their compressed states via the pin's capture by the securement mechanism of the tag body. The spring compression causes the concentric parts 1506, 1508, 1510 to slide out of each other when the pin 1516 is released from the tag body so that the tack assembly 1500 automatically returns to its unengaged position.

In some cases, the springs can be selected so that the tack assembly 1500 pops up and away from the tag body when the pin 1516 is released from the tag body. A magnet may be used here to capture the tack assembly 1500 while in flight via its magnetic attraction with the pin 1516 or other metal component of the tack assembly 1500. The captured tack assembly 1500 can then be placed in a collection bin for later reuse. In some scenarios, this tag architecture is used in conjunction with self-checkout stations and/or kiosks.

Figure 16:
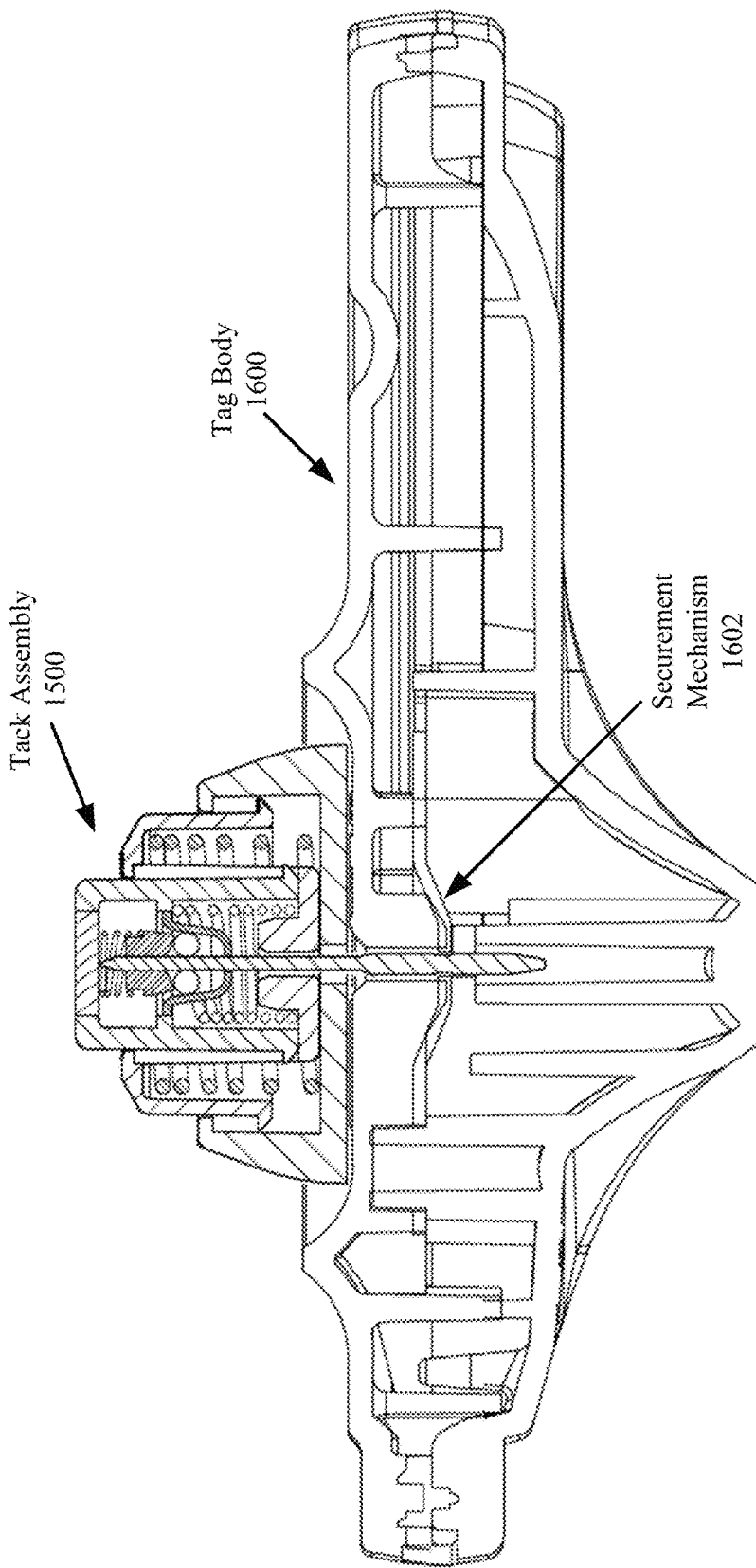
FIG. 16 is a cross-sectional view of the tack assembly shown in FIG. 15 coupled to a tag body.
Figure 17:
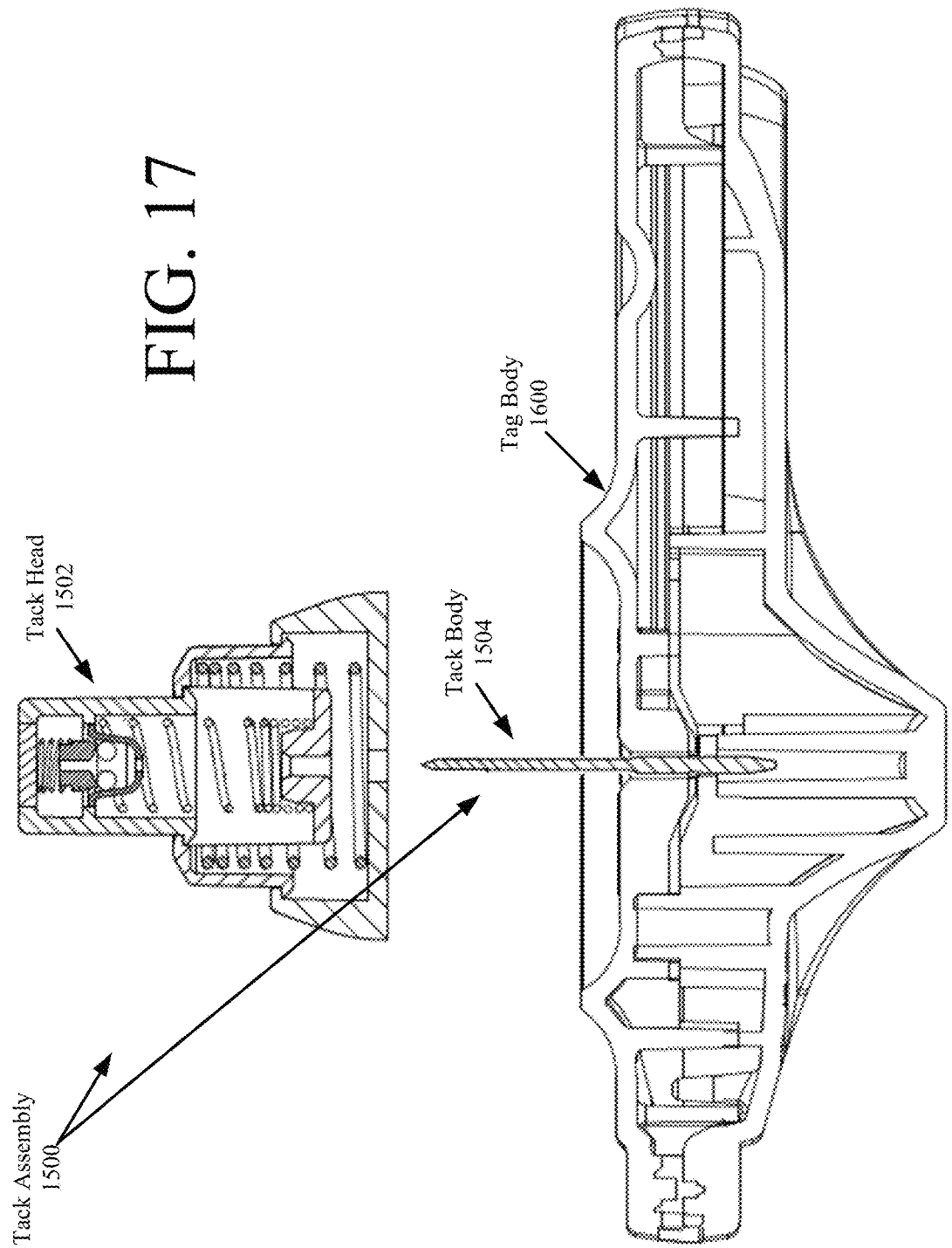
FIG. 17 is a cross-sectional view of the tack shown in FIG. 15 coupled to a tag body and not the tack head.

Referring now to FIG. 16, there is provided a cross-sectional view of the tack assembly 1500 coupled to a tag body 1600 via a securement mechanism 1602 (e.g., a clamp). As noted above, the tack head 1502 can be selectively decoupled from the tack body 1504 (or pin 1516) via application of a magnetic field thereto. FIG. 17 provides a cross-sectional view showing (a) the tack head 1502 decoupled from the tack body 1504 and (b) the tack body 1504 still coupled to the tag body 1600.

Figure 18:
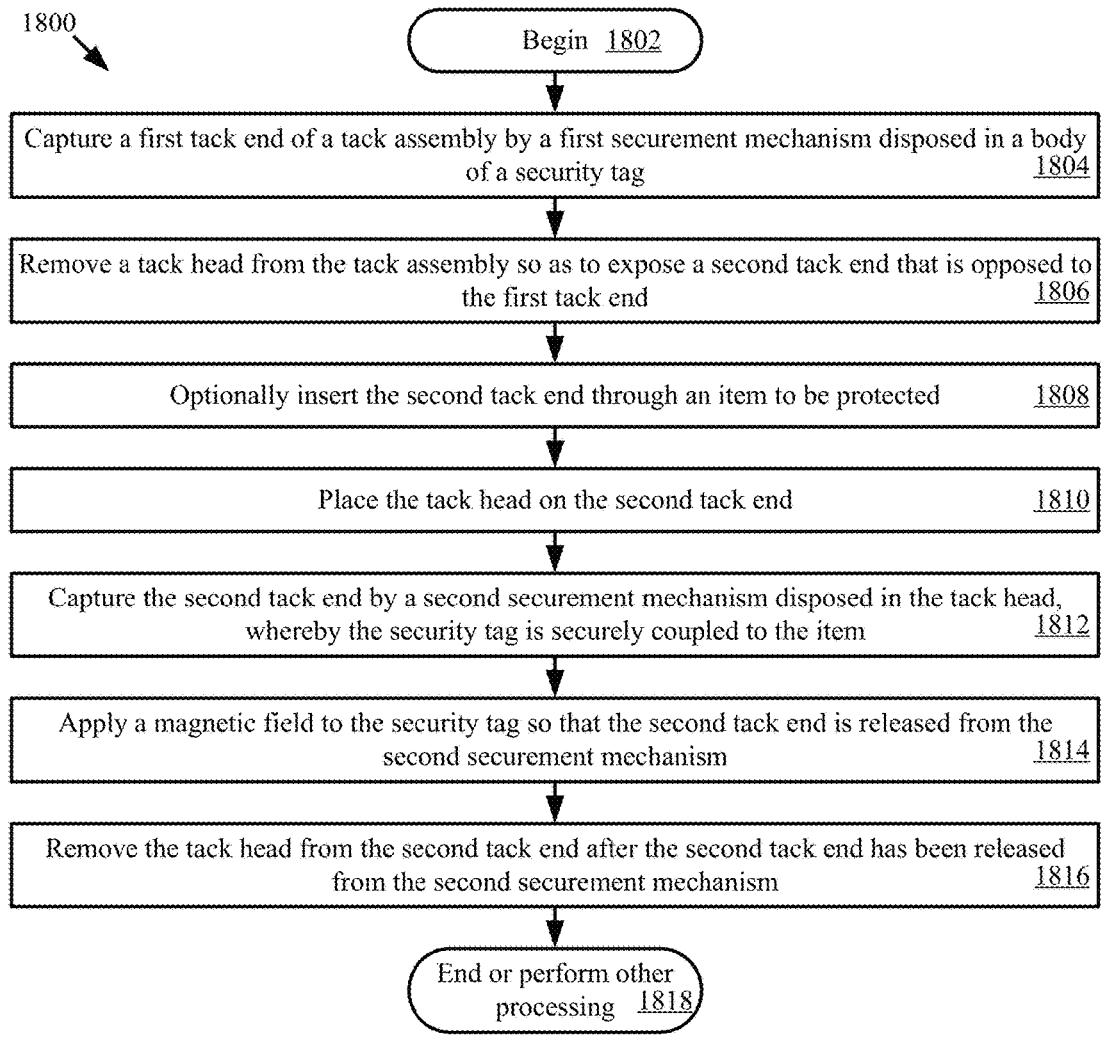
FIG. 18 provides a flow diagram of an illustrative method for operating a security tag.

Referring now to FIG. 18, there is provided a flow diagram of an illustrative method 1800 for operating a security tag (e.g., security tag 132 of FIG. 1). Method 1800 comprises various operations 1804-1816. The order of some of these operations can be different than that shown in FIG. 18. For example, 1804 could alternatively occur after 1812.

As shown in FIG. 18, method 1800 begins with 1802 and continues with 1804 where a first tack end (e.g., end 908 of FIG. 9, 1316 of FIG. 13, 1520 of FIG. 15) of a tack assembly (e.g., tack assembly 800 of FIGS. 8-11, 1300 of FIG. 13, 1400 of FIG. 14, or 1500 of FIG. 15) is captured by a first securement mechanism (e.g., securement mechanism 406 of FIGS. 4-7, 912 of FIG. 9, or 1602 of FIG. 16) disposed in a body (e.g., body 202 of FIG. 2, 900 of FIG. 9, or 1600 of FIG. 16) of the security tag. Next in 1806, a tack head (e.g., tack head 802 of FIGS. 8-11, 1302 of FIG. 13, 1420 of FIG. 14, or 1502 of FIG. 15) is removed from the tack assembly so as to expose a second tack end (e.g., end 906 of FIG. 9 or 1518 of FIG. 15) that is opposed to the first tack end. The second tack end is optionally inserted through an item to be protected, as shown by 1808. Thereafter, the tack head is placed on the second tack end in 1810. In 1812, the second tack end is captured by a second securement mechanism (e.g., securement mechanism 924 of FIG. 9, 1512 of FIG. 15) disposed in the tack head. The second securement mechanism can include, but is not limited to, a ball clutch.

In 1814, a magnetic field is applied to the security tag so that the second tack end is released from the second securement mechanism. The tack head is then removed from the second tack end as shown by 1816. A gripping mechanism can be used here to remove the tack head from the tack. Additionally or alternatively, the tack head is removed from the second tack end using at least one resilient member (e.g., spring(s) 1320, 1322 of FIG. 13, or 1532, 1534 of FIG. 15) disposed in an internal cavity of the tack head. The resilient member is in a compressed state prior to when the magnetic field is applied to the security tag. Subsequently, 1818 is performed where method 1800 ends or other processing is performed.

Figure 19:
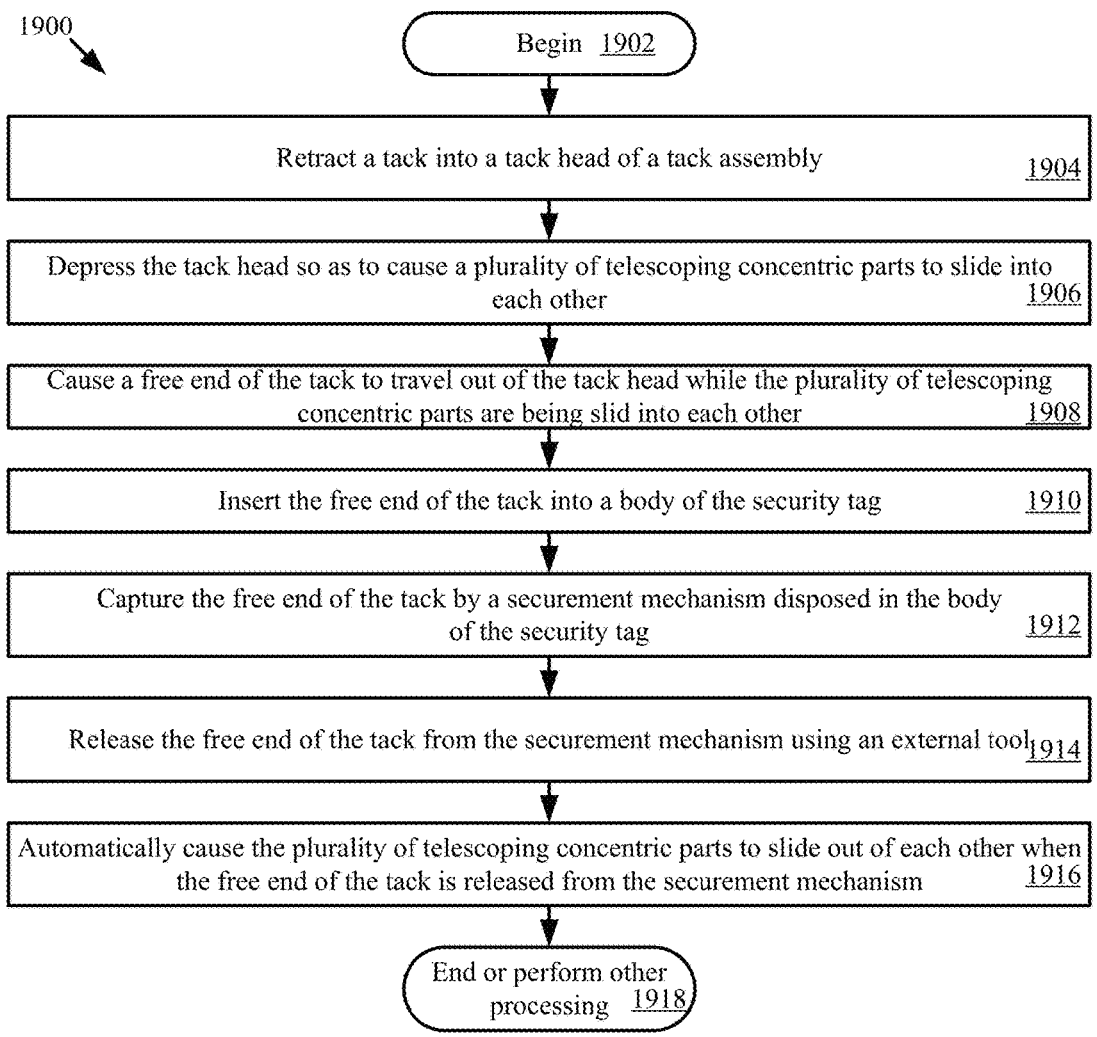
FIG. 19 provides a flow diagram of another illustrative method for operating a security tag.

Referring now to FIG. 19, there is provided a flow diagram of an illustrative method 1900 for operating a security tag (e.g., security tag 132 of FIG. 1). Method 1900 comprises various operations 1904-1916. The order of some of these operations can be different than that shown in FIG. 19.

As shown in FIG. 19, method 1900 begins with 1902 and continues with 1904 where a tack (e.g., tack 804 of FIGS. 8-11, 1310 of FIG. 13, or 1504 of FIG. 15) is retracted into a tack head (e.g., tack head 802 of FIGS. 8-11, 1302 of FIG. 13, 1420 of FIG. 14, or 1502 of FIG. 15) of a tack assembly (e.g., tack assembly 800 of FIGS. 8-11, 1300 of FIG. 13, 1400 of FIG. 14, or 1500 of FIG. 15). The tack head is depressed in 1906 so as to cause a plurality of telescoping concentric parts (e.g., parts 1304-1308 of FIG. 13, 1402 of FIG. 14, 1506-1510 of FIG. 15) to slide into each other. In 1908, a free end (e.g., end 1316 of FIG. 13, or 1520 of FIG. 15) of the tack is caused to travel out of the tack head while the plurality of telescoping concentric parts are being slid into each other. The free end of the tack is inserted into a body (e.g., body 202 of FIG. 2, 900 of FIG. 9, or 1600 of FIG. 16) of the security tag in 1910. In some scenarios, the tack is passed through an item to be protected prior to being inserted into the security tag's body. Next in 1912, the free end of the tack is captured by a securement mechanism (e.g., securement mechanism 406 of FIGS. 4-7, 912 of FIG. 9, or 1602 of FIG. 16) disposed in the body of the security tag. The free end of the tack is released from the securement mechanism in 1914 using an external tool (e.g., arcuate probe 302 of FIG. 3). The telescoping concentric parts are automatically caused to slide out of each other when the free end of the tack is released from the securement mechanism, as shown by 1916. At least one resilient member (e.g., spring(s) 1320, 1322 of FIG. 13, or 1532, 1534 of FIG. 15) reliantly biases at least one of the telescoping concentric parts in a direction away from the tag body so as to cause the plurality of telescoping concentric parts to slide out of each other. Subsequently, 1918 is performed where method 1900 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a security tag, comprising:
capturing a first tack end of a tack assembly by a first securement mechanism disposed in a body of the security tag;
removing a tack head from the tack assembly so as to expose a second tack end that is opposed to the first tack end;
placing the tack head on the second tack end; and
capturing the second tack end by a second securement mechanism disposed in the tack head.

2. The method according to claim 1, further comprising inserting the second tack end through an item to be protected prior to placing the tack head on the second tack end.

3. The method according to claim 1, wherein the second securement mechanism comprises a ball clutch.

4. The method according to claim 1, further comprising applying a magnetic field to the security tag so that the second tack end is released from the second securement mechanism.

5. The method according to claim 4, further comprising removing the tack head from the second tack end after the second tack end has been released from the second securement mechanism.

6. The method according to claim 5, wherein the tack head is removed from the second tack end using a gripping mechanism.

7. The method according to claim 5, wherein the tack head is removed from the second tack end using at least one resilient member disposed in an internal cavity of the tack head, the resilient member being in a compressed state prior to when the magnetic field is applied to the security tag.

8. The method according to claim 1, wherein the tack head is coupled to the security tag's body via a lanyard.

9. The method according to claim 1, wherein the tack head comprises a plurality of telescoping concentric parts.

10. A security tag, comprising:

a tag body having a first securement mechanism configured to releasibly capture a first tack end of a tack; and a tack assembly comprising the tack, a tack head configured to be removably coupled to the tack so that a second tack end opposed to the first tack end can be selectively accessed, and a second securement mechanism disposed in the tack head that is configured to releasably capture the second tack end within the tack head.

11. The security tag according to claim 10, wherein the second tack end is inserted through an item to be protected prior to when the tack head is placed on the second tack end.

12. The security tag according to claim 10, wherein the second securement mechanism comprises a ball clutch.

13. The security tag according to claim 10, wherein the second tack end is released from the second securement mechanism when a magnetic field is applied to the security tag.

14. The security tag according to claim 10, wherein the tack head is removed from the second tack end after the second tack end has been released from the second securement mechanism.

15. The security tag according to claim 14, wherein the tack head is removed from the second tack end using a gripping mechanism.

16. The security tag according to claim 14, wherein the tack head is removed from the second tack end using at least one resilient member disposed in an internal cavity of the tack head, the resilient member being in a compressed state prior to when the magnetic field is applied to the security tag.

17. The method according to claim 10, wherein the tack head is coupled to the security tag's body via a lanyard.

18. The method according to claim 10, wherein the tack head comprises a plurality of telescoping concentric parts.

* * * * *